US00RE50150E

(19) United States
(12) Reissued Patent
Truong et al.

(10) Patent Number: US RE50,150 E
(45) Date of Reissued Patent: Oct. 1, 2024

(54) LID AND KNOB CONFIGURED FOR STACKING

(71) Applicant: Meyer Intellectual Properties Ltd., Kowloon (HK)

(72) Inventors: Jacquelyn Maitram Truong, Hong Kong (CN); Hin Hang Homer Cheung, Hong Kong (CN); Kwong Wah Lee, Hong Kong (CN)

(73) Assignee: Meyer Intellectual Properties Ltd. (VG)

(21) Appl. No.: 18/113,739

(22) Filed: Feb. 24, 2023

Related U.S. Patent Documents

Reissue of:
(64) Patent No.: 11,208,235
Issued: Dec. 28, 2021
Appl. No.: 16/546,610
Filed: Aug. 21, 2019

U.S. Applications:
(60) Provisional application No. 62/720,381, filed on Aug. 21, 2018.

(51) Int. Cl.
*B65D 21/02* (2006.01)

(52) U.S. Cl.
CPC ..... *B65D 21/0217* (2013.01); *B65D 2543/00027* (2013.01)

(58) Field of Classification Search
CPC ..... A47J 36/06; A47J 45/063; B65D 2543/00027; B65D 21/02; B65D 21/0217
See application file for complete search history.

(56) References Cited

U.S. PATENT DOCUMENTS 3,047,186 A * 7/1962 Serio ..... A47J 36/06 220/231
4,615,457 A * 10/1986 Harding ..... B65D 77/28 220/709
4,714,173 A * 12/1987 Ruiz ..... B65D 77/28 220/709

(Continued)

FOREIGN PATENT DOCUMENTS

CN 201641754 11/2010
CN 103705130 6/2018

(Continued)

OTHER PUBLICATIONS

International Search Report dated Dec. 5, 2019 issued in connection with corresponding PCT Application No. PCT/US2019/047451.

(Continued)

*Primary Examiner* — Sarah B McPartlin
(74) *Attorney, Agent, or Firm* — Akerman LLP

(57) ABSTRACT

A pot or pan lid is configured for stacking with identical or differently sized lids that have an identical handle or knob with a dimple on the upper surface. The side of the lid opposite the handle has a complimentary protrusion configured to stably engage the dimple. The edge of the knob may extend laterally to correspond with the lid curvature to also support a similar lid on the knob perimeter that is distal from the dimple. The engaged central dimple and more distal perimeter of the knob provide for stable stacking of a plurality of lids in a level arrangement that avoids one or more lids tipping over.

36 Claims, 8 Drawing Sheets

(56) References Cited

U.S. PATENT DOCUMENTS

| | | | | |
|---|---|---|---|---|
| 4,811,860 | A * | 3/1989 | Sorenson | B65D 47/06 206/508 |
| 7,178,685 | B2 * | 2/2007 | Hidalgo | A47G 19/2272 220/254.1 |
| D560,964 | S | 2/2008 | Hoff | |
| 8,544,679 | B2 * | 10/2013 | Cuillery | A47J 45/063 220/772 |
| 8,733,582 | B2 * | 5/2014 | Fioritto | B65D 51/246 220/709 |
| 9,737,169 | B2 | 8/2017 | Denny | |
| 11,208,235 | B2 | 12/2021 | Truong et al. | |
| 2006/0151511 | A1 * | 7/2006 | Kaposi | B65D 43/022 220/805 |
| 2006/0261065 | A1 * | 11/2006 | Claypool | B65D 43/021 220/212 |
| 2010/0230319 | A1 * | 9/2010 | Thomson | A47J 36/06 220/573.1 |
| 2011/0139667 | A1 * | 6/2011 | Burgess | B65D 21/04 206/515 |
| 2013/0098920 | A1 | 4/2013 | Lee | |
| 2013/0213841 | A1 | 8/2013 | Ward | |
| 2015/0024104 | A1 | 1/2015 | Denny | |
| 2016/0278555 | A1 * | 9/2016 | Taormina | B65D 25/28 |

FOREIGN PATENT DOCUMENTS

| | | |
|---|---|---|
| CN | 207506092 | 6/2018 |
| CN | 207506092 U | 6/2018 |
| EP | 1876935 | 1/2008 |
| EP | 1876935 B1 | 1/2008 |

OTHER PUBLICATIONS

Written Opinion of the International Searching Authority dated Dec. 5, 2019 issued in connection with corresponding PCT Application No. PCT/US2019/047451.

* cited by examiner

LID AND KNOB CONFIGURED FOR STACKING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED CASES

The present application *is a reissue application of U.S. Pat. No. 11,208,235, issued Dec. 28, 2021, from U.S. patent application Ser. No. 16/546,610 filed Aug. 21, 2019, which* claims the benefit of provisional patent application 62/720,381 filed Aug. 21, 2018, the contents of which are hereby incorporated herein by reference.

TECHNOLOGY

The present disclosure is directed to lids for cookware, in particular stackable lid sets in which the configuration of the knob and lid facilitate stacking.

BACKGROUND

Cookware storage can be cumbersome due to different sized and dimensioned articles. One method that has been used to address cookware storage is utilization of lid and knob combinations that stack. However, such stackable lid and knob combinations are difficult to stack and tend to lack stability when stacked. Moreover, as knobs serve the function of protecting a hand of a user from a hot lid while it is gripped for removal, some stackable lids are deficient in this respect.

SUMMARY

In one aspect, a lid stacking system includes two or more stackable lids. Each lid may comprise a cover, an upper stacking platform, and a lower stacking platform. The cover may include an expanse of covering material adapted to cover an interior volume defined by a cooking vessel. The covering material may extend from a central portion of the cover to an outer rim. The upper stacking platform may include a knob extending from an upper surface of the cover at the central portion, and a dimple centrally disposed in the knob between an upper knob surface that extends around a periphery of the knob. The lower stacking platform may include a protrusion extending from a lower surface of the cover at the central portion. The upper stacking platform of each of the lids may be complementary to the lower stacking platforms of the other lids such that lower stacking platforms may be stacked with upper stacking platforms to stably stack the lids. When stably stacked, the protrusion of a first lower stacking platform of a first lid at least partially fills the dimple of a second upper stacking platform of a second lid.

In one embodiment, an adjacent surface to the protrusion along the lower surface of the cover of the first lid supportingly engages the upper knob surface along a periphery of the knob of the second lid when the first and second lids are stably stacked. In one example, a surface of the protrusion of first lid may supportingly engage a surface of the dimple of the second lid when the first and second lids are stably stacked. In another example, the engagement between the adjacent surface and upper knob surface provides primary support for the stable stacking of the first lid and second lid. In a further example, a surface of the protrusion of first lid supportingly engages a surface of the dimple of the second lid when the protrusion is offset within the dimple. In another example, the upper surface of the knob of the second lid supportingly engages the adjacent surface of the first lid along an annular engagement path. The upper surface of the cover of each lid may be convex and the lower surface of the cover of each lid may be concave. The expanse of covering material may be semi-spherical. The covers of the first and second lids may preferably have comparable radius of curvatures.

In various embodiments, the protrusion of the first lid may be dimensioned to press fit within the dimple of the second lid.

In one embodiment, the protrusion of the first lid fills at least 80% of the dimple of the second lid when at least partially received therein In some embodiments, the two or more stackable lids comprise at least three lids wherein the upper stacking platforms and lower stacking platforms are substantially the same such that the lids may be stacked in any order.

In one embodiment, the knob and protrusion of each lid are connected to the cover through a hole in a central apex of cover.

In various embodiments, the knob of each of the stackable lids further comprise a semi-annular handle that pivotable upward from a storage position in which it lies against a flat expanse of the covering material.

In another aspect, a stacking platform for a lid stacking system includes a first upper stacking platform and a first lower stacking platform. The first upper stacking platform may include a knob extending from an upper surface of a cover of a first lid and may include an upper knob surface and a centrally disposed dimple. The cover may be adapted for covering a container or vessel. The first lower stacking platform may include a protrusion extending from a lower surface of the cover. The first upper stacking platform may be configured to stably stack with a lower stacking platform of a second stacking platform of a second lid when the dimple at least partially receives a protrusion of the lower stacking platform of the second stacking platform having substantially same dimensions as the protrusion of the first lower stacking platform. The first lower stacking platform may be configured to stably stack an upper stacking platform of a third stacking platform of a third lid when the protrusion is at least partially received within a dimple disposed in a knob of the upper stacking platform of the third stacking platform having substantially same dimensions as the dimple and knob of the first upper stacking platform. An adjacent surface to the protrusion along the lower surface of the cover may supportingly engage an upper knob surface along a periphery of the knob of the upper stacking platform of the third stacking platform when the protrusion is at least partially received therein. Additionally or alternatively, a surface of the protrusion may supportingly engage a surface of the dimple of the upper stacking platform of the third stacking platform when the protrusion is at least partially received therein.

In various embodiments, the adjacent surface supportingly engages the upper knob surface along the periphery of the knob of the upper stacking platform of the third stacking platform along an annular engagement path. In one example, the expanse of covering material is semi-spherical and the adjacent surface is concave. In a further example, the covers of the first, second, and third lids have comparable radiuses of curvature.

In still another aspect, a lid for covering a container or vessel that comprises a cover comprising a semi-spherical expanse of a covering material having a circular outer rim and a central apex. A knob may extend from the central apex to protrude from an upper convex surface of the cover. The knob may include an upper surface with a first centrally disposed dimple. A protrusion may extend from the central apex to protrude from a lower concave surface of the cover. The protrusion may be shaped to engage and at least partially fill a second dimple in a knob of a second lid to stably stack the lid on the second lid. The second dimple may have substantially same dimensions as the first dimple.

In one embodiment, the upper surface of the knob terminates at a circular periphery. The knob and the circular periphery of the knob may be configured to supportingly engage an annular portion a second concave surface of the second lid having a comparable radius of curvature of the lower concave surface of the lid.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 7A is a cross-sectional elevation view of a lid stacking system including two or more lids in accordance with the lid of FIG. 7 stacked in a series, whereas

DESCRIPTION

Figure 1A:
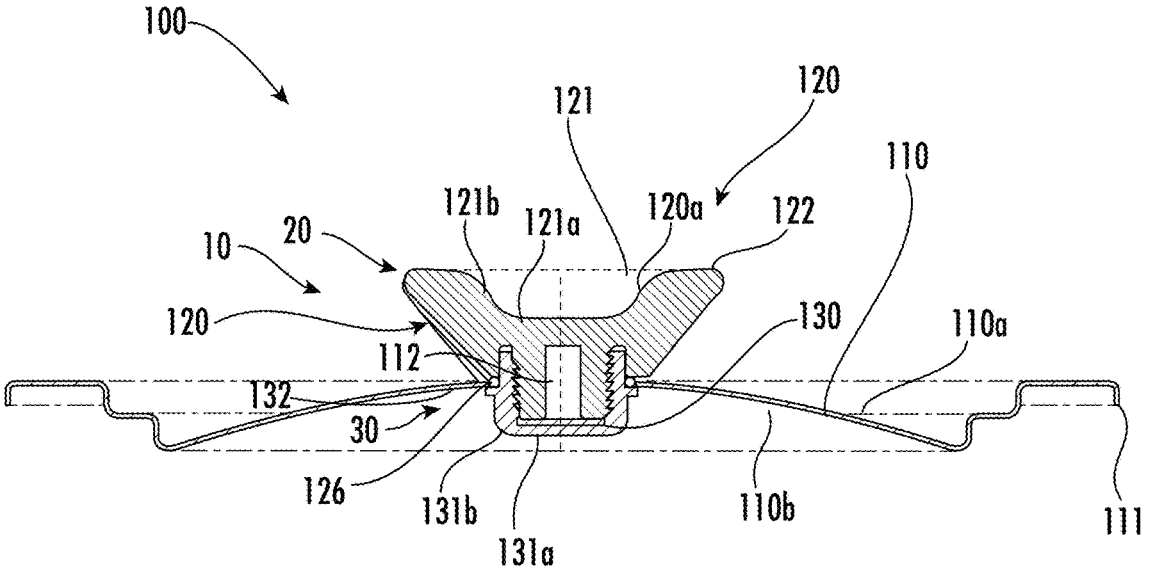
FIG. 1A is a cross-sectional elevation view of a stackable lid according to various embodiments.

The present disclosure describes lids for cookware or storage vessels having stackable configurations.

Various embodiments may include a stackable lid system, stackable lids, or components thereof, such as stacking platform components, e.g., knobs, protrusions, covers, or flanges. Stackable lids of a stackable lid system may comprise complementary stacking platforms configured to stackably supportingly engage to thereby stably stack the lids. Such lids may be configured with a top knob for grasping. The configuration of the lid and knob may facilitate stacking of lids for storage or display, for example. In one embodiment, lids of a stackable lid system may include two or more lids of different sizes or diameters configured for use with different size or diameter cooking or storage vessels. In a further or another embodiment, lids of a stackable lid system may be of similar size or diameter configured for use with similar sized and/or diameter cooking vessels. Thus, the present disclosure describes stackable lid systems that may provide pots or storage vessel lids of similar different sizes configured with knobs for stacking. The present disclosure may also be used to provide stackable lid systems configured to cover a wide range of pots, vessels, or containers. Stackable lid systems or lids including stacking platforms are configured such that stacks of lids are easily stacked in stable configurations. Stackable lid systems or lids including stacking platforms or components thereof according to the present disclosure may beneficially incorporate stacking platforms and knobs in a configuration wherein such knobs are also easy to grasp or hold while maintaining space between a grasping hand of a user and a hot cover portion of the lid. The stackable lid platforms described herein may be used to provide stable stacking of conventional convex lids for storage. Further, using the stackable lid platforms described herein in, a user may easily align and stack additional lids without disturbing the stability of the stack.

FIGS. 1A-8 illustrate various embodiments of new and improved lid stacking systems 2, lids 100, and components thereof according to various embodiments of the present disclosure, wherein like reference numerals refer to like components in the various views.

A lid 100 for a stacking system 10 may include a stacking platform 10 comprising an upper stacking platform 20, lower stacking platform 30, or both. The upper stacking platform 20 is configured to stack with a complementary lower stacking platform of another lid and the lower stacking platform 30 is configured to stack with a complementary upper stacking platform of another lid.

In some embodiments, an upper stacking platform 20 of a lid 100 is configured to stack with a complementary lower stacking platform having the same or similar dimensions as the lower stacking platform 30 of the stacking platform. Similarly, the lower stacking platform 30 may be configured to stack with complementary upper stacking platforms having the same or similar dimensions as the upper stacking platform 20. Thus, a lid stacking system 10 may include a plurality of lids 100 having the same or similar stacking platforms 10 allowing the lids 100 to be stacked in multiple orders. A complementary stacking platform is a stacking platform configured to stack with a particular stacking platform, which may include multiple stacking platforms.

A lid 100 may include a knob 120 wherein the knob 120 includes at least a portion of a stacking platform 10. For example, with general reference to FIG. 2, a knob 120 may be configured to provide an upper stacking platform 20 that facilitates stacking of the lid 100 for storage or display with other stackable lids 100' having complementary stacking platforms 10', specifically, lids 100' with complementary lower stacking platforms 30'. Lids 100, 100' having complementary stacking platforms 10, 10' may include an upper stacking platform 20 configured to stack with a lower stacking platform 30' of the complementary stacking platform 10'. Alternatively or additionally, lids 100, 100' having complementary stacking platforms 10, 10' may also include a lower stacking platform 30 configured to stack with an upper complementary stacking platform 20'. Thus, in some embodiments, lids 100, 100' having complementary stacking platforms 10, 10' may stack in multiple orders and may be interchangeable. In various embodiments, complementary stacking platforms 10, 10' may include the same or substantially similar upper stacking platforms 20, 20' and/or the same or substantially similar lower stacking platforms 30, 30.

Figure 1B:
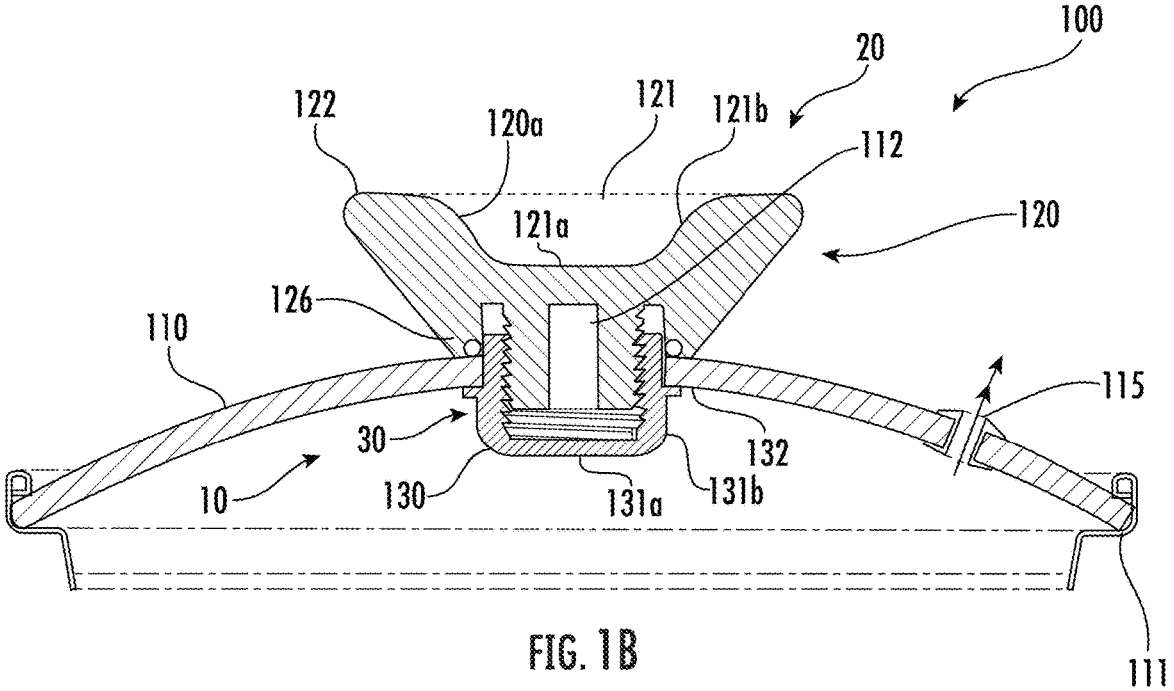
FIG. 1B is a cross-sectional elevation view of a stackable lid according to various embodiments.

FIGS. 1A & 1B each illustrate an example lid 100 of a lid stacking system according to various embodiments. The lid 100 comprises an expanse of covering material, which may include multiple materials, configured for covering an interior volume defined by a pot, pan, storage container, or other vessel. The covering material or expanse thereof may be referred to herein as a cover 110 or cover portion of the lid 100. The cover 110 may include an expanse of the covering material that extends from a central portion of the cover to an outer rim 111. The cover 110 preferably comprises a semi-spherical expanse of a covering material having a circular, which may include elliptical, outer rim 111 and a central apex 112. In other embodiments, cover 110 comprises expanses of material defining other shapes such as square, rectangular, other geometric or non-geometric shape, or free form.

The lid 100 may include a knob 120. The knob 120 may extend from an upper surface 111b of the cover 110, typically at or near a central portion or central apex 112, for gripping by a user. The knob 120 preferably has an inverted frustoconical shape to provide a safe grip region at that is spaced apart from the cover 110 that may become hot from cooking. The knob 120 may include a surface 120a and a concave dimple 121. The dimple 121 may be centrally disposed with respect to the knob 120 and/or cover 110. In the illustrated embodiments, the knob 120 is connected at a central apex 112 to protrude from an upper convex surface 101 of the cover 110. In other embodiments, the cover 110 may include a planar expanse of cover material from which the knob 120 extends from an upper surface 111a thereof.

The protrusion 130 may be connected to the central portion or central apex of the cover 110 to extend away from the concave lower surface 110b of the cover 110. The protrusion 130 will typically extend from the lower surface 110b of the cover 110, below the knob 120. For example, the protrusion 130 may extend from the central apex 112 to protrude from a lower surface 111b of the cover 110. In a preferred embodiment, the protrusion 130 extends from the central apex 112 to protrude from the lower 110b surface wherein all or a portion of the lower surface 110b around the protrusion 130, e.g., a perimeter surface extending around the protrusion 130, extends way from the protrusion at a downwardly directed angle. For example, the lower surface 110b may comprise a concave surface. In the embodiments illustrated in FIGS. 1A-5, the cover 110 extends from the central apex 112 to define the lower surface 110b comprising a concave lower surface 110b opposing a convex upper surface 110a. The central apex 112 should be understood as a geometric construct that lies with the portion of the lid 100 corresponding to the region occupied by the knob 120 and protrusion 130. The knob 120 and protrusion 130 may comprise an assembly that passes through the apex. For example, the expanse of lid covering material may penetrate at the apex 112 to insert and connect the knob 120. In some embodiments, the protrusion 130 may be directly coupled to the knob 120 through the cover 110.

The protrusion 130 may formed integrally with the cover 110 or may be connected to the knob 120 via a shaft that extends through an aperture at the central apex 112, illustrated as assembled at mating threads in FIGS. 1A-4.

For example, in the embodiments illustrated in FIGS. 1A-4, the knob 120 couples to the protrusion 130 through a hole at the apex 112. The shaft may be provided by a threaded pair of connectors that protrude in opposing direction from a bottom of the knob 120 toward the protrusion 130. The protrusion 130 may include a threaded socket for threadably mating with a threaded shaft extending from the lower end of the knob 120. To mate the knob 120 and protrusion 130, the knob 120 and threaded shaft may be rotated until a base of the knob 120 contacts the upper surface 110a of the cover 110 and an opposed flange extending around the protrusion contacts the lower surface 110b of the cover 110. The knob 120 and protrusion 130 assembly may be utilized with covers having multiple thicknesses. For example, the cover 110 illustrated in FIG. 1A is thinner than the cover 110 illustrated in FIG. 1B. When the knob 120 and threaded shaft are rotated to threadably mate with the threaded socket of the protrusion 130 in the embodiment of FIG. 1B, the base of the knob 120 contacts the upper surface 110a of the cover 110 and the opposed flange contacts the lower surface 110b of the cover to provide a secure connection before all the threads are utilized. In some embodiments, a knob 120 and protrusion 130 may be configured to couple to the lid 100 independently of each other. In one embodiment, the knob 120 and/or protrusion 130 may be integral with the covering material 110. For example, the covering material 110 may be molded or formed to include one or more portions of the knob 120 and/or protrusion. In the case of metal lids 100, for example, the lids 100 can be shaped for stacking in the forming operation to integrally form the convex protrusion 130, eliminating the need for extra lid or knob components relative to conventional lids and knob fittings. A gasket or o-ring 126 may be positioned between the cover 110 and one or more surfaces of the knob 120 and/or protrusion 130. For example, an annular gasket or o-ring 126 may be disposed between the knob 120 and the cover 110 to provide a water and vapor seal to the knob 120/cover 110 interface. The cover may comprise any material such as metal, alloy, glass, or ceramic. A vent 115 (FIG. 1B) may be provided through cover 110. In some embodiments, the vent 115 is sealable.

The dimple 121 and protrusion 130 may have any shape, so long as the protrusion 130 is dimension to fit within a dimple of a complementary upper stacking platform and/or the dimple 121 is dimensioned to fit a protrusion of a complementary lower stacking platform when the lids are in a level stack. Level stack refers to the reference plane of each lid 100, defined by a common intersection with the lid rim 111, is parallel to the other reference planes in the stack. That is one lid is not tilted or skewed with respect to any other rim or the supporting surface at the level of the lowest rim lid in the stack. The knob 120, lid 100 and protrusion 130 preferably have circular symmetry, but may have other shapes. Likewise, the dimple 121 may be semi-spherical in shape, or have a rectangular cross-section of the generally rectangular cross-section illustrated in FIGS. 1A-4. Corners or edges may be straight or may be rounded as illustrated in FIGS. 1A-4. In the illustrated embodiments in FIGS. 1A & 1B, the upper stacking platform 20 is complementary to the lower stacking platform 30. The dimple 121 extends to a relative depth so that the protrusion can fill at least about 40 percent of the dimple, but more preferably 60 percent, and most preferably at least about 80 percent of the dimple 121 depth.

As introduced above, the lids 100 illustrated in FIGS. 1A & 1B include a stacking platform 10 having a configuration complimentary to a stacking platform of another stackable lid, such as another stackable lid wherein the two lids together comprise at least a portion of a lid stacking system. A lid stacking system may include a plurality of lids 100 wherein the lids 100 are configured to stably stack. Stacking may be interchangeable or may be specific to one or more lids 100 of the stacking system. The stacking platform 10 may comprise an upper stacking platform 20 for stacking of additional lids onto the stacking platform 10. In various embodiments, the upper stacking platform 20 may be integrated, at least in part, with the knob 120. For example, a knob surface 120a may be dimensioned to stably supportingly engage a complementarily dimensioned stacking platform of another lid, such as with a lower stacking platform positioned along and/or extending from a lower surface of the cover of the other lid.

The upper stacking platform 20 comprises dimple 121 defined in the knob surface 120a. For example, the knob surface 120a may include one or more sidewalls 121b that extend to a base 121a that together define the dimple 121. The dimple 121 may be sized and shaped to receive a protrusion of a complementary lower stacking platform. The dimple 121 may extend to a depth approximately equivalent or greater than a length of a corresponding protrusion of a complementary lower stacking platform. The depth of the dimple 121 relative to the length of the corresponding protrusion may be at least about 40 percent of the dimple 121, but more preferably 60 percent, and most preferably at least about 80 percent of the dimple 121 depth. A width of the dimple 121 may be greater than or approximately equivalent to that of the corresponding protrusion. In some embodiments, a depth, width, or both of the dimple 121 may be sized to provide a tight or press fit with the corresponding protrusion.

The knob surface 120a may also include an upper surface 122 that extends at least partially around a perimeter of the dimple 121. The upper surface 122 will generally extend along a periphery of the knob 120. The upper surface 122 may comprise a perimeter or periphery that extends between a perimeter of the dimple 121 and an outer, upper peripheral edge of the knob 120. The upper surface 122 may define and annular outer, upper periphery of the knob 120, which may include generally circular, elliptical, or arcuate. Additionally or alternatively, the upper surface 122 may define an outer, upper periphery of the knob 120 comprising two or more sides, such as triangular, square, rectangular, pentagram, or other geometric or non-geometric shapes.

The upper stacking platform 20 may also comprise one or more engagement surfaces along the knob surface 120a. In one example, the one or more engagement surfaces along the knob surface 120a are configured to supportingly engage one or more engagement surfaces of a complementary lower stacking platform. For example, the one or more engagement surfaces along the knob surface 120a comprise at least a portion of the one or more sidewalls 121b, base 121a, upper surface 122, or combination thereof. In one configuration, the upper surface 122 comprises one or more engagement surfaces along an upper peripheral edge of the knob 120 or between an outer, upper edge of the dimple 121 and the outer, upper peripheral edge of the knob 120 for engaging corresponding engagement surfaces along a lower stacking platform. Additional or alternatively, one or more of the sidewall 121b or base 121a may comprise an engagement surface for engaging a corresponding engagement surface of a protrusion of a complementary lower stacking platform. Portions of the knob surface 120a comprising engagement surfaces may be continuous or discontinuous, e.g., multiple spaced apart engagement surfaces may be provided.

As introduced above, the upper surface 122 may comprise one more engagement surfaces for engaging a corresponding engagement surface of a complementary lower stacking platform. Such engagement surfaces may extend along annular paths or paths having two or more sides. In a preferred embodiment, the upper surface 122 includes a circular engagement surface for engaging a lower stacking platform having a comparable radius of curvature. In some embodiments, the upper surface 122 may include raised portions extending along and engagement path configured to supportingly engage corresponding engagement surfaces of a complementary lower stacking platform located along the lower surface of the cover around the protrusion. Engagement surfaces may be planar, curved, and/or angled relative to the horizontal or to the expanse of material extending along the lower surface of the cover. For example, a cover may comprise a convex expanse of material along the lower surface or a surface that angles downwardly with respect to the central apex or central portion of the cover. In one embodiment, the upper surface 122 includes engagement surfaces positioned at an angle corresponding to an angle of an engagement surface of a complementary lower stacking platform to which the upper surface 122 is to supportingly engage to increase contact area along interfacing surfaces during stacking. In one example, the corresponding engagement surfaces along the upper surface 122 and the complementary lower stacking platform extends at a complementary angles. In one embodiment, a central region of the cover 110, which may include the central apex 112 or larger central region, may be planar and a peripheral expanse may angle downward from the central region to provide a concave lower surface. In a further example, the peripheral expanse curves such that the cover comprises a semi-spherical expanse of cover material.

In an above or a further example, the lid having the complementary lower stacking platform to which the engagement surface along upper surface 122 supportingly engages includes a cover comprising a semi-spherical expanse of material having a convex lower surface. In the above example, the upper surface 122 of the knob 120 may include an engagement surface that extends along a path having outer periphery with a comparable radius of curvature as a corresponding engagement surface along the complementary lower stacking platform, which may correspond to the radius of curvature of the semi-spherical cover. In some embodiments, the radius of curvatures of the cover 110 from which the knob 120 extends is comparable to the radius of curvature of the cover or engagement surface along which the upper surface 122, e.g., the outer periphery of the knob 120 supportingly engages. In a further example, the upper surface 122 includes an engagement surface that extends at an angle corresponding to the curvature or angle of the engagement surface along the complementary lower stacking platform to further increase contact area along the interfacing surfaces during stacking.

The stacking platform 10 may additionally or alternatively comprise a lower stacking platform 30 for stacking the stacking platform 10 onto a complementary stacking platform of another lid wherein at least a portion of the lower stacking platform 30 comprises a protrusion 130. The protrusion 130 may be dimensioned, e.g., sized and shaped, to be received by an upper stacking platform, e.g., within a dimple formed in a knob, of another lid. The protrusion 130 may extend a length approximately equivalent or less than a depth of a corresponding dimple of a complementary upper stacking platform. In one example, the protrusion 130 may be dimensioned to at least partially fill a dimple formed in a knob surface of another lid comprising a complementary upper stacking platform. The length of the protrusion 130 fill at least about 40 percent of the dimple, but more preferably 60 percent, and most preferably at least about 80 percent of the dimple depth. A width of the protrusion 130 may be greater than or approximately equivalent to that of the corresponding dimple.

In a further or another embodiment, the protrusion 130 may be dimensioned to supportingly engage and at least partially fill a dimple formed in a knob surface of another lid comprising a complementary upper stacking platform. For example, the protrusion 130 may include one or more engagement surfaces along the one or more sidewalls 131b, base 131a, or both configured to supportingly engage a base or sidewall defining the dimple. In some embodiments, a length, width, or both of the protrusion 130 may be sized to provide a tight or press fit with the corresponding dimple.

In some embodiments, the one or more engagement surfaces may additionally or alternatively include an adjacent surface 132 of the protrusion 130. An engagement surface of the lower stacking platform 30 may comprise an adjacent surface 132 of the protrusion 130 comprising a portion of the concave surface of the lower surface 110b or other expanse of material positioned around the protrusion 130. In some embodiments, the adjacent surface 132 comprises a concave surface or a surface that angles downwardly with respect to the central apex 112 or central portion. The adjacent surface 132 may comprise a lower surface 110b of the cover 110, which may include the same or different material relative to adjacent expanses of cover material. In an embodiment, the adjacent surface 132 is flush and/or continuous with the surrounding expanse of material. In one embodiment, the adjacent surface comprises an insert or flange that extends adjacent to the protrusion 130. In some embodiments, the adjacent surface 132 may comprise a radius of curvature. In a preferred embodiment, the radius of curvature of the adjacent surface 132 is comparable to a radius of curvature of an engagement surface along an upper surface of the corresponding upper stacking platform.

Figure 2:
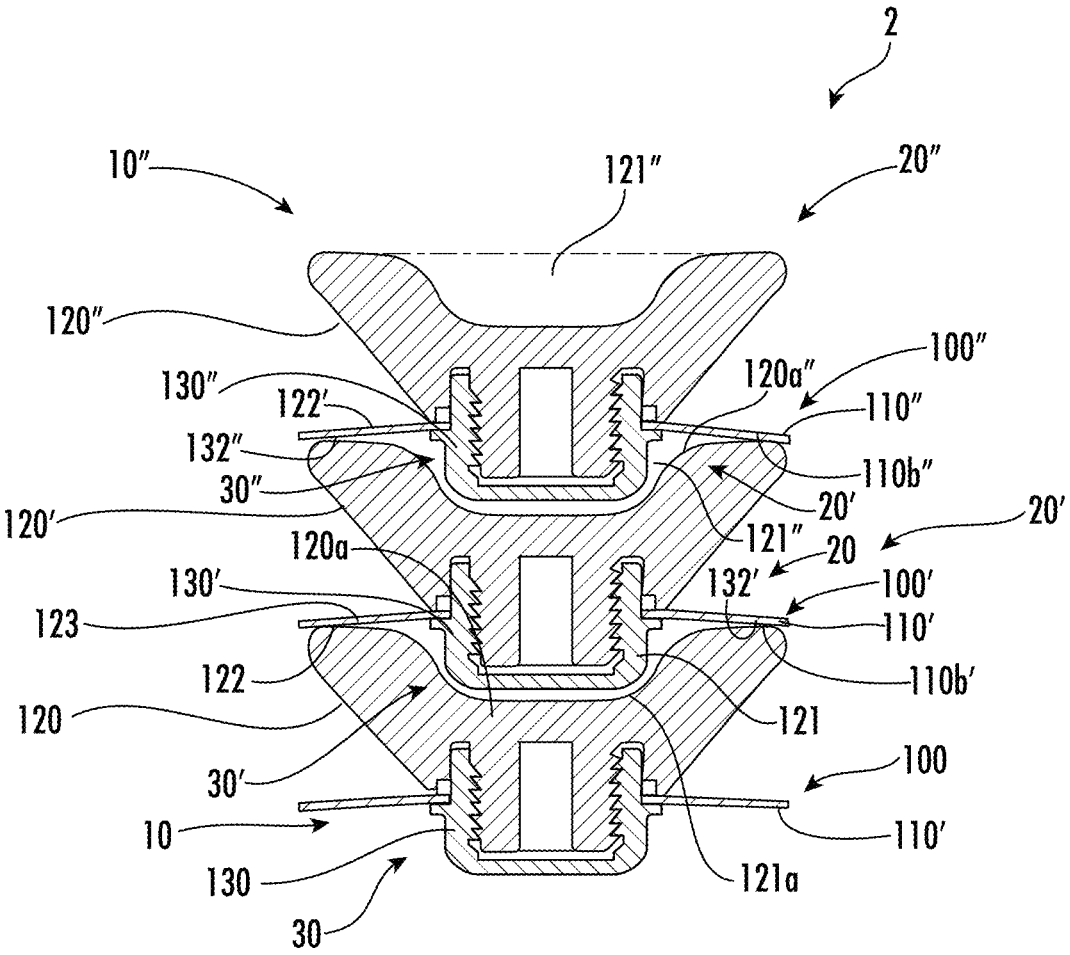
FIG. 2 is a cross-sectional elevation view of a central portion of a lid stacking system including two or more stackable lids in accordance with the lid of FIG. 1A stacked in a series.
Figure 3:
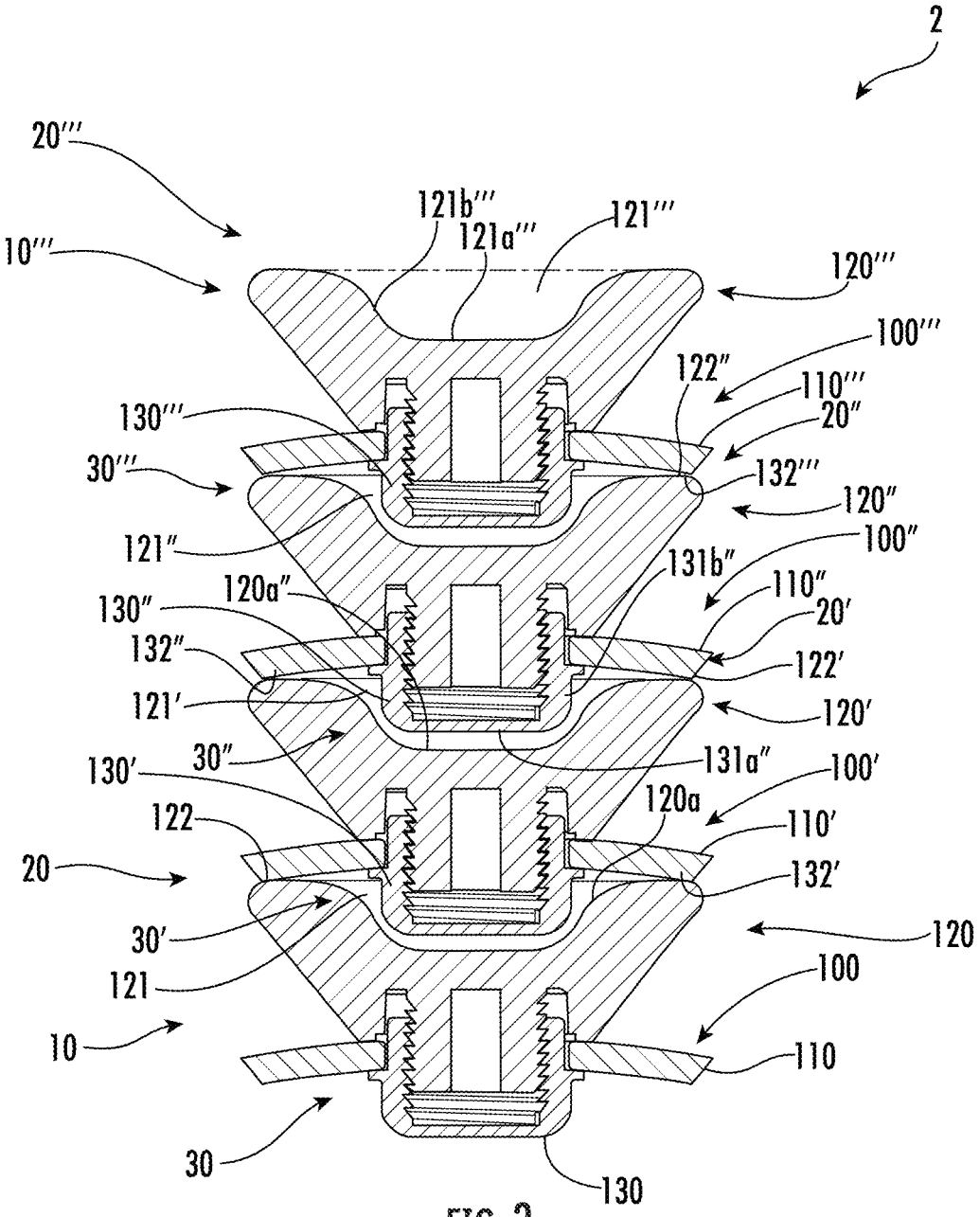
FIG. 3 is a cross-sectional elevation view of a central portion of a lid stacking system including two or more stackable lids in accordance with the lid of FIG. 1B stacked in a series.

Fitment between the protrusion 130 and dimple may be a tight or press fit. In some embodiments, the protrusion 130 or engagement surfaces thereof do not engage a sidewall and/or base of the dimple of the complementary upper stacking platform. For example, as shown in FIGS. 2 & 3, multiple lids 100, 100', 100", 100'" may stack with the protrusion 130' (or 130",130'") disposed within but not contacting the concave dimple 121 surfaces 121b, 121a. In some embodiments, the protrusion 130 may supportingly engage a dimple surface 121b, 121a if the protrusion becomes offset with respect to the fitment within the dimple or an engagement surface comprising an adjacent surface 132 to the protrusion 130 along the lower surface of the cover 110 has disengaged with the engagement surface of the complementary upper stacking platform of the other lid, e.g., an upper surface of a knob. For example, complementary upper and lower stacking platforms may be supported by the engagement of the upper surface of the knob and the adjacent surface 132. In another embodiment, the adjacent surface 132 does not contact protrusion 130 or engagement surfaces thereof do not engage an upper surface of the knob of a complementary upper stacking platform, or may only engage if the protrusion 130 becomes offset with respect to the fitment within the dimple. For example, the lower stacking platform 30 may primarily engage with the upper stacking platform of a complementary stacking platform along the one or more sidewalls 131b, base 131a, or both with the corresponding one or more sidewalls, base, or both of the dimple.

The adjacent surface 132, e.g., lower surface 110b or flange, adjacent to the [projection] *protrusion* 130 preferably comprises an annular perimeter to provide increased surface engagement and encourage concentric alignment. For example, the adjacent surface 132 may be dimensioned to provide an annular engagement surface around the perimeter of the protrusion 130. In a further example, the adjacent surface 132 is configured to supportingly engage an upper surface of the knob around a 360° engagement path. Preferably, the adjacent surface 132 or lower surface 110b of cover 110 comprising the adjacent surface 132 is concave or angled outwardly downward such that the adjacent surface 132 comprises an annular perimeter engagement surface that favors the concentric alignment. In another embodiment, the adjacent surface 132 is level or convex. The engagement around the engagement path may be continuous or discontinuous. The adjacent surface 132 may comprise an engagement path corresponding to a cross-section of an engagement portion of an upper surface of a knob as described herein. In some embodiments, an engagement surface of the adjacent surface 132 includes a projection for engaging the upper surface of a knob.

While certain descriptions of various features of the stacking platform 10 are described above and elsewhere herein with specific reference to an upper stacking platform 20 or lower stacking platform 30, it is to be understood that features described with respect to upper or lower stacking platforms complementary to such upper and lower stacking platforms 20, 30 may apply equally to corresponding upper stacking platform 20 or lower stacking platform 30 of the illustrated stacking platform 10.

FIG. 2 is a cross-sectional view of a lid stacking system 2 according to various embodiments. The lid stacking system 2 includes two or more stackable lids 100, 100', 100" for covering a container or vessel in accordance with the embodiment of FIG. 1A. The lids 100, 100', 100" comprise a cover 110, 110', 110" including a covering material configured to cover an interior volume defined by a pot, pan, storage container, or other vessel. The covers 110, 110', 110" include convex lower surfaces 110b, 110b', 110" having comparable radius of curvature, at least along adjacent surfaces 132, 132', 132" defining annular engagement paths. The covers 110, 110', 110" may be semi-spherical. Each lid 100, 100', 100" includes a knob 120, 120', 120" that protrudes from the upper surface 110a, 110a', 110a" of the cover 110, 110', 110". The knobs 120, 120', 120" are preferably circular to provide upper surfaces 122, 122', 122" adapted to support the concave lower surface 110b, 110b', 110b" of another lid 100, 100', 100" having a comparable radius of curvature along the adjacent surface 132, 132', 132". The knobs 120, 120', 120" and protrusions 130, 130', 130" are connected at the central apex, in a manner similar to that described above with respect to FIGS. 1A & 1B, to respectively protrude from the convex upper surface 110a, 110a', 110b" and the concave lower surface 110b, 110b', 110b" of the cover 110, 110', 110".

The lids 100, 100', 100" include complementary stacking platforms 10, 10', 10" such that stacking platforms 10, 10', 10" may supportingly engage to stably stack the lids 100, 100', 100". The stacking platforms 10, 10', 10" may comprise an upper stacking platform 20, 20', 20" for stacking of lids 100, 100', 100" thereon. The stacking platforms 10, 10', 10" also comprise lower stacking platforms 30, 30', 30" for engaging complementary upper stacking platforms 20, 20', 20" to stably stack the lids 100, 100', 100". The knobs 120, 120', 120" comprise at least a portion of the upper stacking platforms 20, 20', 20". The lower stacking platforms 30, 30', 30" include protrusions 130, 130', 130", adjacent surfaces 132, 132', 132". Knobs 120, 120', 120" include knob surfaces 120a, 120a', 120a" configured to stably engage one or more engagement surfaces of a lower stacking platform 30, 30', 30" positioned along and/or extending from a lower surface 110b, 110b', 110b" of the cover 110, 110', 110". The knobs 120, 120', 120" include dimples 121, 121', 121" dimensioned to receive a protrusion 130, 130', 130" of a lower stacking platform 30, 30', 30". As shown, the stacking platforms 10, 10', 10" are cross-compatible such that upper stacking platforms 20, 20', 20" are complementary to all three lower stacking platforms 30, 30', 30" and include the same or similar configuration. In other embodiments, one or more of the upper stacking platforms 20, 20', 20" may not be cross-compatible with all the lower stacking platforms 30, 30', 30" and/or one or more of the lower stacking platforms 30, 30', 30" may not be cross-compatible with all the upper stacking platforms 20, 20', 20".

Further to the above, the illustrated stacking system 2 includes a first lid 100 comprising a first stacking platform 10. The first stacking platform 10 comprises a first upper stacking platform 20. In some embodiments, the first stacking platform 10 also includes a first lower stacking platform 30, as illustrated, but in other embodiments, the first stacking platform 10 does not include a lower stacking platform 30. The first upper stacking platform 20 includes a first knob 120 comprising a first knob surface 120a. The knob 120 is preferably circular to provide a first upper surface 122 that is adapted to support a second lower surface 110b' having a concave surface. The second lower surface 110b' or adjacent surface 132' thereof may include a comparable radius of curvature to the first upper surface 122 to increase engagement area.

The first knob surface 120a includes one or more first sidewalls 121b extending to a first base 121a that defines a first dimple 121. The first knob surface 120a further includes an upper surface 122 extending around a perimeter of the first dimple 121 and between an upper outer perimeter or periphery of knob 120.

The stacking system 2 further includes a second lid 100' comprising a second stacking platform 10'. The second stacking platform 10' comprises a second lower stacking platform 30'. In some embodiments, the second stacking platform 10' also includes a second upper stacking platform 20', as illustrated, but in other embodiments, the second stacking platform 10' does not include an upper stacking platform 20'. The second lower platform 30' includes a second protrusion 130' comprising one or more second sidewalls 131b' extending to a second base 131a'. The second lower platform 30' also includes a second adjacent surface 132' extending adjacent to the second protrusion 130'.

The second lower stacking platform 30' is shown stacked with the first upper stacking platform 20 of the complementary first stacking platform 10. The second protrusion 130' is received within the first dimple 121. In the illustrated embodiment, the second lower stacking platform 30' and the first upper stacking platform 20 are supportingly engaged along an engagement path comprising one or more engagement surfaces. Engagement may be discontinuous along one more of the engagement surfaces, but is preferably continuous when stacked. The first upper surface 122 and the second adjacent surface 122 may be configured to supportingly engage along an engagement path. The engagement path may extend along surfaces positioned around the perimeters of the first dimple 121, such as an upper outer periphery of the first knob 120, and the second protrusion 130'. Engagement may be along an engagement path extending around the full perimeters wherein interfacing surfaces engage around the full or substantially full perimeter. In one embodiment, engagement may be along an engagement path comprising surfaces extending around the full perimeters wherein points of engagement are spaced apart along the path. The engagement path is preferably annular to provide increased surface engagement. For example, the second adjacent surface 132' may be dimensioned to provide an annular engagement surface around a perimeter of the second protrusion 130' and the first upper surface 122 may be dimensioned to provide a corresponding annular engagement surface along a perimeter of the first dimple 121. The second adjacent surface 132' may be concave having a radius of curvature along the engagement path comparable to a radius of curvature along the engagement path of the engagement surface of the first upper surface 122 to encourage concentric alignment. In a further example, the second adjacent surface 132' is configured to supportingly engage the first upper surface 132 of the knob around a 360° engagement path.

In the illustrated embodiment, the first base 121a is positioned at a depth greater than the length of second protrusion 130' such that the second base 131a' does not engage the first base 121a of the first dimple 121. The width between and around the first sidewall 121b is also greater that the width between and around the second sidewall 131b' of the second protrusion 130'. In the illustrated embodiment, the first upper stacking platform 20 and second lower stacking platform 30' are primarily supported by engagement along the first upper surface 122 and the second adjacent surface 132'. In some embodiments, the sidewalls 121b, 131b' may engage if fitment becomes offset. In other embodiments, fitment between the second protrusion 130' and first dimple 121 may be a tight or press fit. The second protrusion 130' may occupy at least 40% of the first dimple 121, more preferably at least 60%, or even more preferably at least 80% of the first dimple 121.

The second lower surface 110b' includes a concave surface that extends downwardly outward from the second protrusion 130' and includes a radius of curvature along the second adjacent surface 132'. For example, the second adjacent surface 132' may define a semi-spherical annular surface. The first upper surface 122 of the first knob 120 includes an engagement surface along a periphery of the first knob 120 that supportingly engages the second adjacent surface 132' and includes a comparable radius of curvature to that of the second adjacent surface 132'. The engagement surface along the first upper surface 122 extends along an annular path. The annular perimeter engagement path favors the concentric alignment. Engagement along the path is preferably substantially continuous; however, in some embodiments, engagement along the path may be discontinuous, e.g., engagement a spaced locations along the path.

In other embodiments, the first base 121a of the first dimple 121 may be supportingly engaged with second base 131a' of the second protrusion 130', the first sidewall 121b of the first dimple 121 may be supportingly engaged with the second sidewall 131b' of the second protrusion 130', and/or the first upper surface 122 may be supportingly engaged with the second adjacent surface 132' along the second lower surface 110b. Engagement may be along discrete lengths or points of the respective surfaces. In some embodiments, the engagement surfaces are configured to engage along a full or a substantially full length of one or more interfacing surfaces. In one embodiment, the second lower stacking platform 30' and the first upper stacking platform 20 may be configured such that the first sidewall 121b and the second sidewall 131b' engage in addition to or instead of the first upper surface 122 and the second adjacent surface 132'. In one such embodiment, the first base 121a of the first dimple 121 may engage with second base 131a' of the second protrusion 130' to provide a tight or press fit. In another embodiment, the second adjacent surface 132' does not engage the first upper surface 122 unless fitment of first dimple 121 and second protrusion 130' is offset. For example, the first upper stacking platform 20 and the second lower stacking platform 30' may primarily engage along one or more of the first base 121a and second base 131a' or the one or more first sidewall 121b and second sidewall 131b'.

The third lid 100" is also shown stacked with the second lid 100' wherein the second upper stacking platform 20' is complementary to the third lower stacking platform 30". The second upper stacking platform 20' and the third lower stacking platform 30" comprise the same or similar features and are stacked as described above with respect to the first upper stacking platform 20 and the second lower stacking platform 30'. Briefly, the second dimple 121 is shown having received the third protrusion 130" and the second upper surface 122' is engaged with the third adjacent surface 132". The second upper surface 122' and the third adjacent surface 132" preferably engage along an annular engagement path to support the third lid thereof. The third stacking platform 10" also includes a third upper stacking platform 20" that is the same or similar to the first and second upper stacking platforms 20, 20' and is cross-compatible for stacking with the first and second lower stacking platforms 30, 30'. In some embodiments, the covers 110, 110', 110" extend to outer rims having the same or different diameters. In an above or another embodiment, two or more of the covers 110, 110', 110" comprise comparable radius of curvatures. In some embodiments, one or more of the stacking platforms 10, 10', 10" does not include either an upper stacking platform 20, 20', 20" or a lower stacking platform 30, 30', 30". In some embodiments, one or more of the stacking platforms 10, 10', 10" is not cross-compatible.

FIG. 3 illustrates a cross-sectional elevation view of a central portion of a lid stacking system 2 including four lids 100, 100', 100", 100'" stackable in a series according to embodiment of FIG. 1B. The four lids 100, 100', 100", 100'" are shown stacked with the first upper stacking platform 20 stacked with the second lower stacking platform 30', the second upper stacking platform 20' stacked with the third lower stacking platform 30", and the third upper stacking platform 20" stacked with the fourth lower stacking platform 20'". The stacking platforms 10, 10', 10", 10'" may be configured and stack as described with respect to FIG. 2. For example, the lids 100, 100',100", 100'" include upper stacking platforms 20, 20',20", 20'" comprising knobs 120, 120', 120", 120'" including dimples 121, 121',121", 121'" and lower stacking platforms 30, 30',30", 30'" comprising protrusions 130, 130',130", 130'". The knobs 100, 100',100", 100'" preferably include circular perimeters and have upper surfaces 122, 122',122", 122'" having circular engagement surfaces therealong positioned along radius curvatures comparable to the corresponding radius curvatures along the adjacent surfaces 132, 132',132", 132'" having. The stacking platforms 10, 10', 10", 10'" are similar or substantially the same and are configured to be cross-compatible for interchangeable stacking. In some embodiments, one or more of the stacking platforms 10, 10', 10", 10'" does not include either an upper stacking platform 20, 20', 20", 20'" or a lower stacking platform 30, 30', 30", 30'". In some embodiments, the covers 110, 110', 110", 110'" extend to outer rims having the same or different diameters. In an above or another embodiment, two or more of the covers 110, 110', 110", 100'" comprise comparable radius of curvatures. In some embodiments, one or more of the stacking platforms 10, 10', 10",10'" does not include either an upper stacking platform 20, 20', 20", 20'" or a lower stacking platform 30, 30', 30", 30". In some embodiments, one or more of the stacking platforms 10, 10', 10", 10'" is not cross-compatible.

Figure 4:
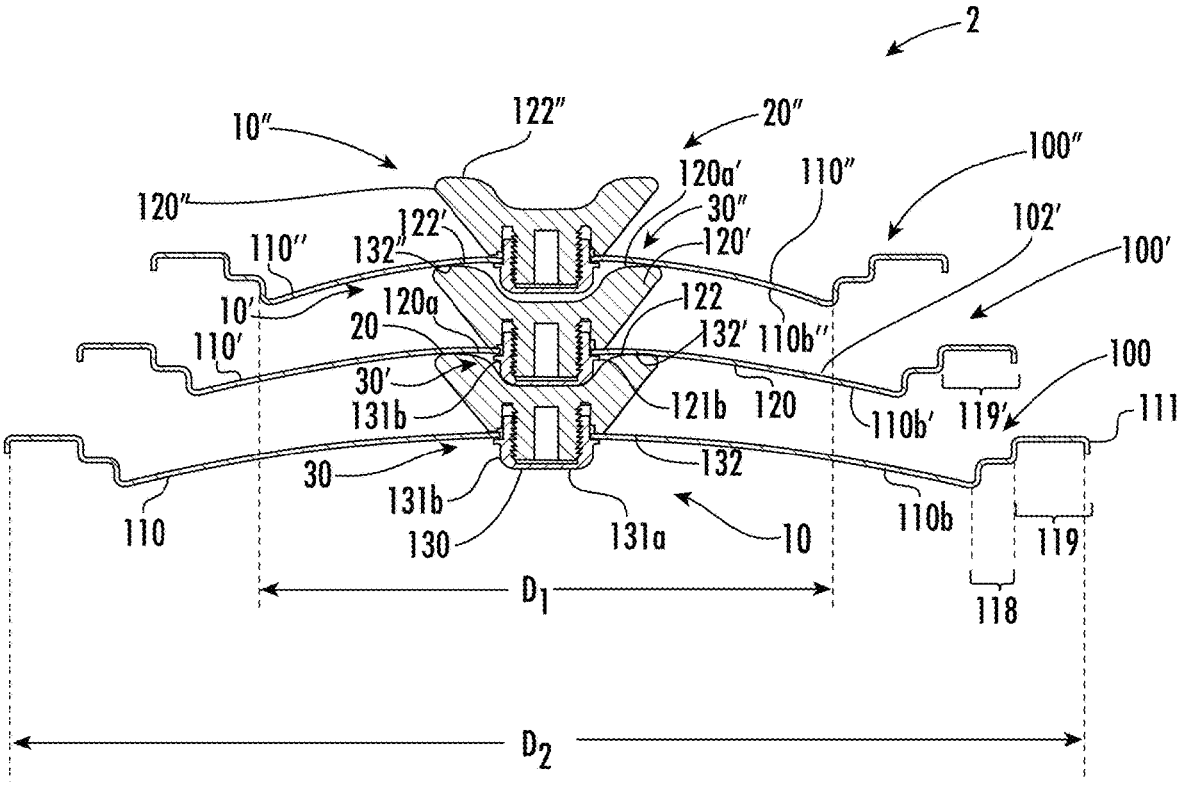
FIG. 4 is a cross-sectional elevation view of a lid stacking system including two or more stackable lids in accordance with the lid of FIG. 1A stacked in a series.

FIG. 4 illustrates an embodiment of a lid stacking system 2 showing stable stacking of convention convex shaped covers 110, 110', 110" for storage. The lids 100, 100', 100" are similar to that described with respect to FIG. 1A. The stacking platforms 10, 10', 10" are configured and may be stacked similar to that described above with respect to FIGS. 2 & 3. Further, the stacking platforms 10, 10', 10" make it easy for the user to align and stack additional lids without disturbing the stability of the stack. For instance, similar to FIGS. 2 & 3, the knobs 120, 120', 120" are preferably circular having a perimeter 122, 122', 122" that is adapted to support a concave lower surface 110b, 110b', 110b" of a second lid 100, 100', 100" with a same or similar knob 120, 120', 120" and comparable radius of curvature. The radius of curvature of the lower surfaces 110b, 110b', 110b" of the covers 110, 110', 110" are also preferably comparable for consistent overhang spacing when stacking. The resting of any upper lid 100', 100" on the upper surface 122, 122', e.g., an upper perimeter or periphery of the knob 120, 120' of a lower lid 100, 100', minimizes any tendency for the lids to tip over as they are stacked.

The lids 100, 100', 100' stacked in FIG. 4 also include a rim 111, 111', 111" with multiple stepped segments to accommodate fitting in a range of vessel diameters. The flat area of the step may fit the width of a single vessel rim, or multiple vessels. The diameters labels D1 and D2 illustrate how three stacked lids 100, 100', 100" may span a diameter range to optionally cover nine different vessel diameters, as the last or upper step 119, 119, 119" of each larger diameter lid 100, 100', 100" extends beyond the last or upper step 119, 119', 119" of the immediately smaller lid 100, 100', 100". For example, the last or upper step 119' of lid 100' extends beyond the last or upper step 119 of lid 100. A smaller step 118, 118', 118" is disposed adjacent and inward, more proximal to apex, of the last or upper step 119. 119', 119".

In other embodiments, with reference to FIGS. 2-4, the protrusion 130' of an upper lid 100' (using lid 100' as an example) may rest on an inner surface 121b, 121a of the dimple 121 of the lower lid 100 (using lid 100 as an example). For example, sidewalls 121a and/or base portion 121c may engage and at least partially support protrusion 130' along sidewall 130a' and/or base 130b', while the lid 100' rests on the upper surface 122 of the knob 120. Alternatively, the protrusion 130' may snap or be magnetically attracted to be disposed within the dimple 121. Sidewall 121b of the dimple 121 preferably defines a gradual sideways S-shaped curvature between the upper surface 122 and base 121a to facilitate gradual guidance and urging of the protrusion 130' into the dimple 121 so the stacked lids 100 and 100', or 100' and 100" are concentric and level. As the sidewall 131b' and/or base 131a' of the protrusion 130' contacts the upper portions of sidewall 121b of the dimple 121 of the lid 100, the protrusion 130' can slide inward as it is released by the user, resulting in a more concentric alignment of the lids 100, 100' in a stack until a corresponding annular adjacent surface 132' supportingly engages the upper surface 122 of the knob 120 to fully support the now leveled upper lid 100' on the upper surface 122.

Figure 5:
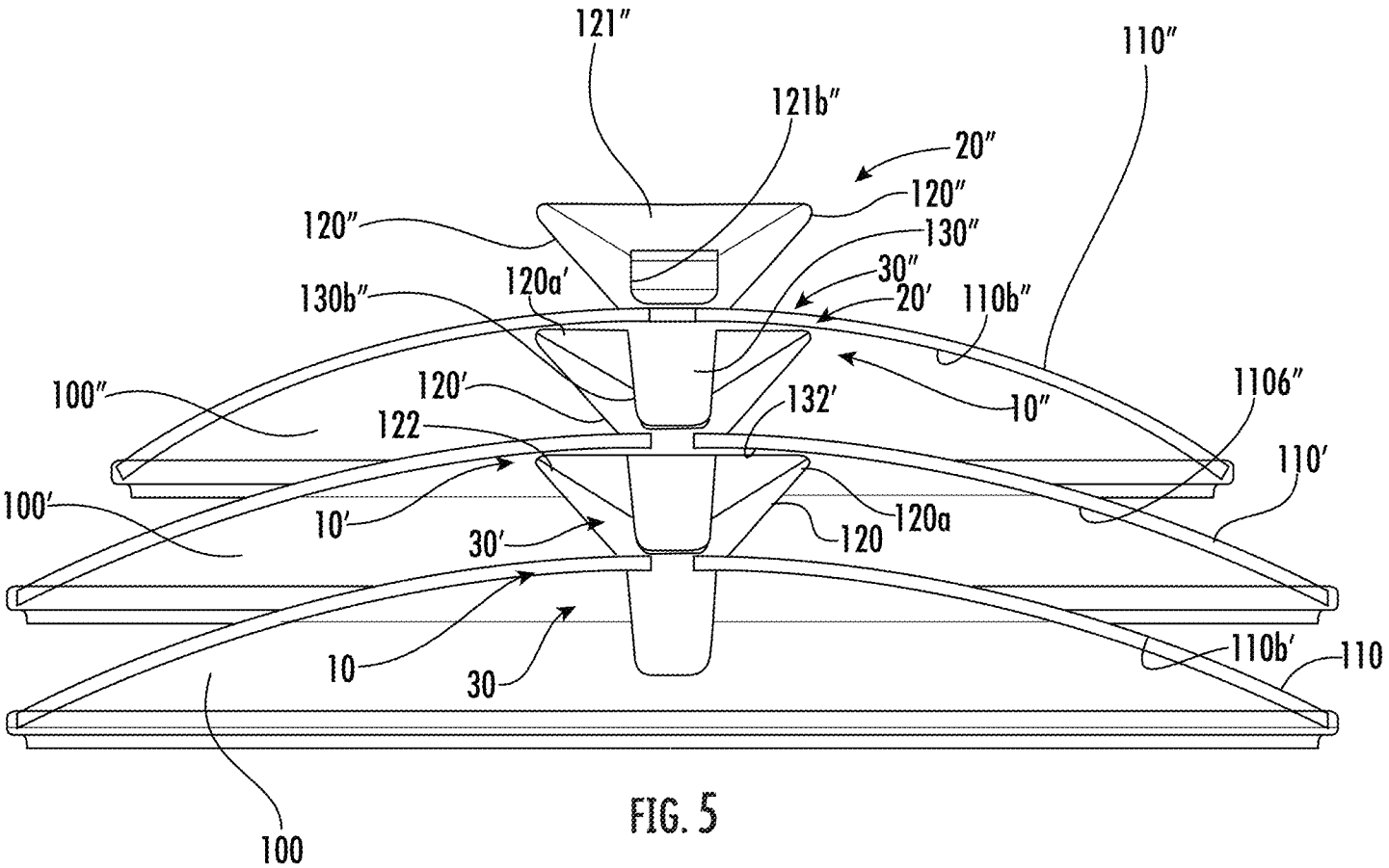
FIG. 5 is a cross-sectional elevation view of a lid stacking system including two or more stackable lids stacked in a series according to various embodiments.

FIG. 5 is a cross-sectional elevation view of a series of three stacked lids 100, 100', 100" in accordance with another embodiment. In this embodiment, the upper stacking platforms 20, 20', 20" each comprise a knob 120, 120', 120" including dimple 121, 121', 121". The dimple 121, 121', 121" has a central that is deeper and narrower than that described above with respect to FIGS. 1A-4. The protrusion 130', 130" includes a base 131a', 131a" and sidewall 130a', 130a" that matingly engage the base 121a, 121a' and sidewall 121b, 121b' of the central bore of the dimple 121, 121'. The mating may comprise a tight or press fit. The dimples 121, 121', 121" also include wider upper portions of sidewall 131b, 131b' that do not engage with the protrusion 130', 130". In some embodiments, upper surfaces 122, 122', 122" of the knobs 120, 120', 120" may also supportingly engage adjacent surfaces 132, 132', 132" along convex lower surfaces 110b, 110b', 110b". In one example, the upper surfaces 122, 122', 122" of the knobs 120, 120', 120" are circular with a radius of curvature comparable to a radius of curvature along adjacent surfaces 132, 132', 132". Similar to FIGS. 2-4, the stacking platforms 10, 10', 10" are similar or substantially the same and are cross-compatible. The covers 110, 110', 110" may also include the same or comparable radius of curvatures.

Figure 6:
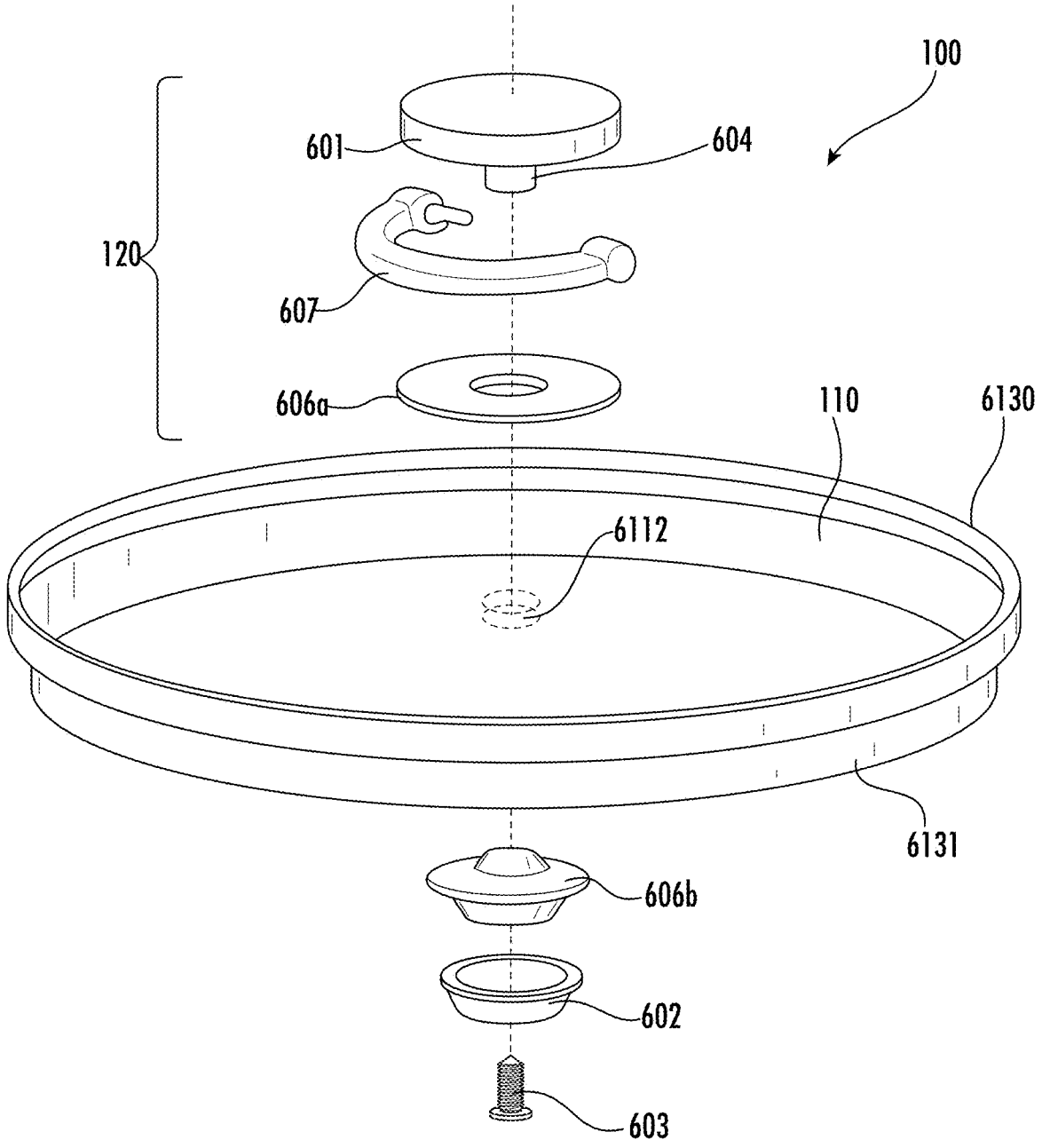
FIG. 6 is an exploded view of a stackable lid according to various embodiments.
Figure 7A:
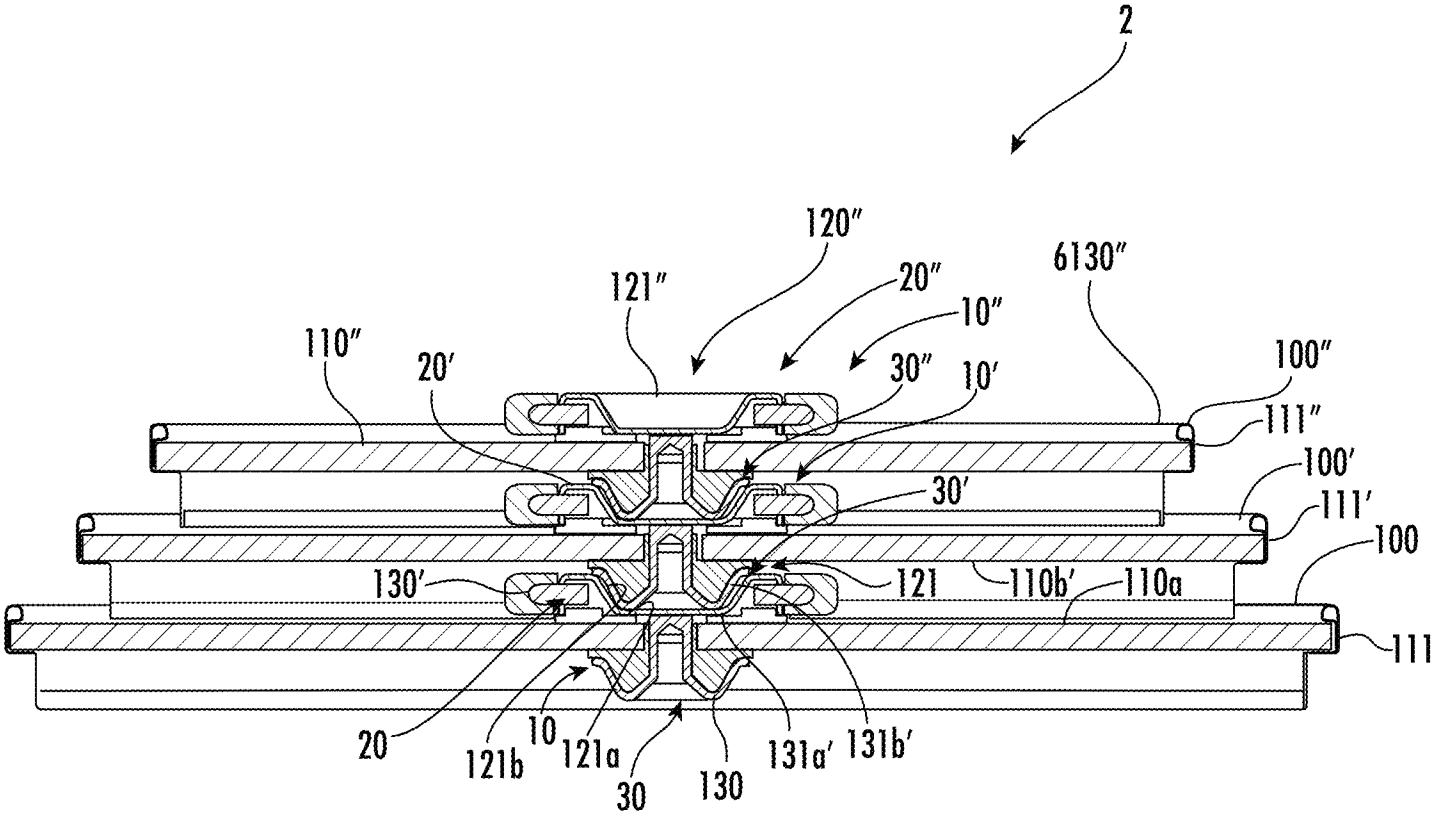
Figure 7B:
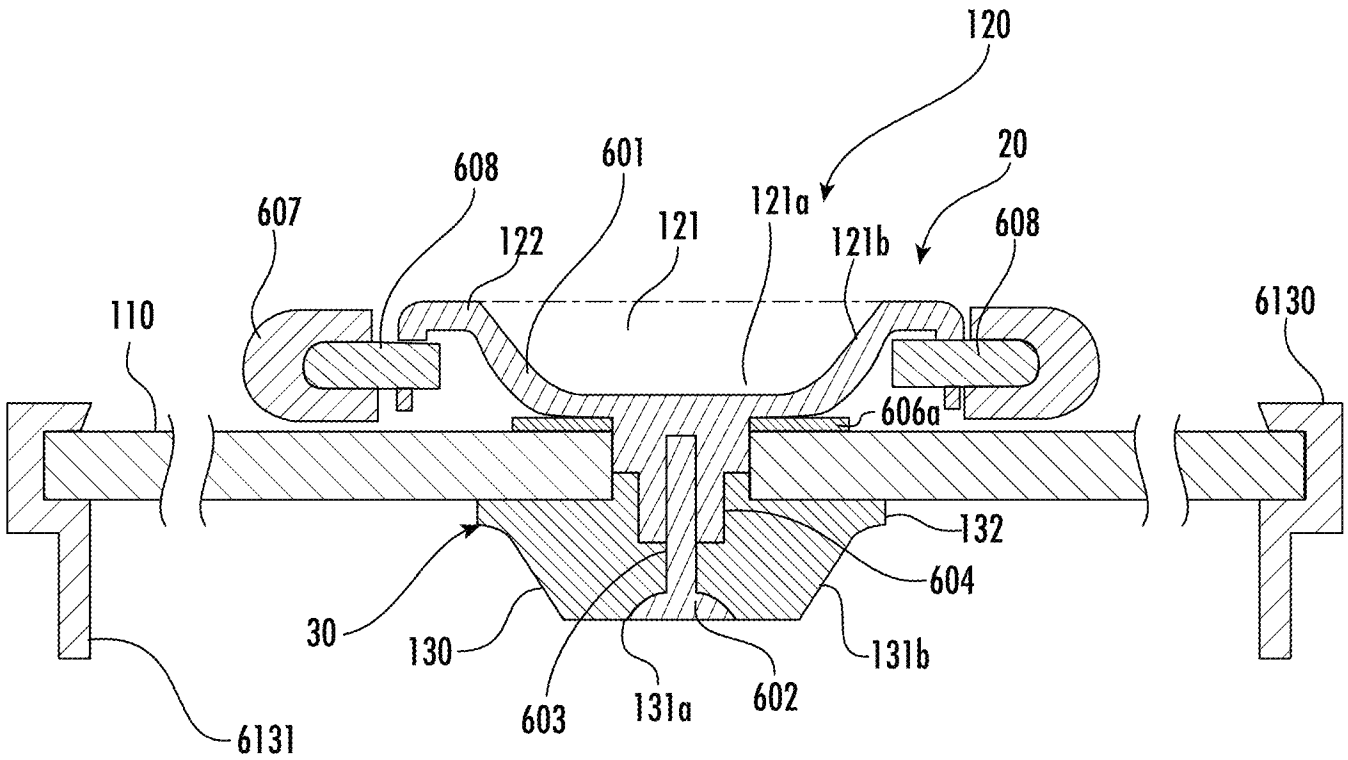
FIG. 7B is an enlarged view of a stacking platform including a central knob as depicted in FIG. 6 and FIG. 7A.

FIG. 6 illustrates another embodiment of the stackable lid system 2 wherein the lid 100 for covering a container or vessel comprises cover 110 having an expanse of a generally planar covering material having a circular outer rim 111. FIG. 7B illustrates a cross-section of the lid 100 assembled and FIG. 7A illustrates a stackable lid system 2 including a plurality of lids 100, 100',100" configured according to FIGS. 6 & 7B.

A knob 120 is connected at a central hole or bore 6112 to protrude from a planar upper surface 110a of the cover 110. The knob 120 has a centrally disposed dimple 121. A protrusion 130 extends from the central apex to protrude from a planar surface 110b of the cover 110. The protrusion 130 is adapted to fit the concave dimple 121.

The knob 120 in this embodiment is constructed from a cap 601 having the central dimple 121. The protrusion 130 comprises a lower inverted cone shaped receiver 602.

The receiver 602 is attached to the cap 601 by a screw 603, which has threaded portions received in a lower shaft 604 of the cap 601. The lower shaft 604 extends into the bore 6112 positioned at the central apex. An upper gasket 606a may be disposed between the cap 601 and the cover 110. The upper gasket 606a is preferred when the cover 110 comprises a glass covering material. A lower gasket 606b may be disposed between a lower surface of the cover 110 and the interior of the receiver 602. The cap 601 is connected to a half annular handle 607, which is pivotable upward, being in hinged connection with the cap 601 by rods 608 at opposing ends. The end of each rod 608 extends into and connects to the handle 607, with the opposing end entering a circular slot in the side of the cap 603. The handle 607 is preferably flat on the side(s) that make contact with the planar lid cover 110 when it is in a folded down position for storage. The upper and lower gaskets 606a, 606b are preferably formed of a resilient elastic material, such as silicone rubber, fluorosilicones or the like.

In some embodiments, the glass expanse covering material may have a metal covering rim 6130 with a downward descending skirt or flange 6131. The flange 6131 extends downward from a lower surface of the glass by at least the total height of the cap 601 and handle assembly, to enable the lids to stack, as shown in FIG. 7A. For example, the first dimple 121 is dimensioned to stackably receive the second protrusion 130' and the second dimple 121' is configured to stackably receive the third protrusion 130". When received, (using first upper stacking platform 20 and the second lower stacking platform 30' as an example) base and sidewall surfaces 121a, 121b of the first dimple 121 supportingly engage with base and sidewall surfaces 131a', 131b' of second protrusion. In some embodiments, first upper surface 122 may supportingly engage second adjacent surface 132' or a surface further toward second rim 111'. The outer rims 111, 111', 111" extend to different diameters but in some embodiments may extend to one or more common diameters. As illustrated and similar to the other embodiments, the upper and/or lower stacking platforms 20, 20', 20", 30, 30', 30" may be the same or substantially similar such that the stacking platforms 10, 10', 10" are cross-compatible. However, in other embodiments, one or more stacking platforms 10, 10', 10" are not cross-compatible.

In one embodiment, a lid stacking system includes two or more stackable lids for covering a container or vessel. Each lid may comprise a covering material configured to cover an interior volume defined by a pot, pan, storage container, or other vessel. The cover may include an expanse of the covering material that extends from a central portion of the cover to an outer rim. In one example, the cover comprises a semi-spherical expanse of covering material and may further include a central apex or central portion of the semi-spherical expanse wherein the covering material extends outward therefrom to a generally circular outer rim. A knob may be connected to the cover at or near the central portion or central apex and protrude from an upper surface of the covering material. Each lid may include a stacking platform complimentary to a stacking platform of another stackable lid of the stacking system such that stacking platforms may supportingly engage to stably stack the lids. The stacking platform may comprise an upper stacking platform for stacking of lids onto the stacking platform. In various embodiments, the upper stacking platform may be integrated at least in part with the knob. For example, the knob may include an upper surface configured to stably engage a complementary stacking platform of another lid, which may comprise a lower stacking platform that is positioned along and/or extends from a lower surface of the cover. The knob may also include a dimple dimensioned to receive a protrusion of the complementary stacking platform. The stacking platform may additionally or alternatively comprise a lower stacking platform for stacking the stacking platform onto a stacking platform of another lid. For example, a lower surface of the cover may include an engagement surface configured to stably engage an upper stacking platform of another lid, e.g., an engagement surface along an upper surface or rim of a knob. In one embodiment, the lower stacking platform may include a protrusion that extends from the lower surface of the cover. The protrusion may be positioned to be received by an upper stacking platform, e.g., within a dimple formed in a knob, of another lid. The protrusion may be shaped to at least partially fill a dimple formed in an upper surface of a knob of another lid comprising a complementary upper stacking platform. In a further or another embodiment, the protrusion may be shaped to supportingly engage and at least partially fill a dimple formed in an upper surface of a knob of another lid comprising a complementary upper stacking platform. For example, the protrusion may include an engagement surface along a base or sidewall configured to engage a base or sidewall defining the dimple. The protrusion may position within the dimple formed by a knob of a complementary upper stacking platform of another lid and be supported thereon. The fitment between the protrusion and dimple may be a tight or press fit. In some embodiments, the protrusion or engagement surfaces thereof do not contact a sidewall and/or base of the dimple of the complementary upper stacking platform or engage only if the protrusion is offset with respect to the fitment within the dimple or an engagement surface adjacent to the protrusion along the lower surface of the cover has disengaged with the engagement surface of the complementary upper stacking platform of the other lid. In one embodiment, the cover extends from the central apex to define a lower concave surface opposing an upper convex surface. An engagement surface of the lower stacking platform may comprise a portion of the lower concave surface, which may include an expanse of the cover material extending around the protrusion. In one example, the protrusion is connected to the central portion or central apex of the cover to extend away from a lower concave surface of the cover. The upper surface of the knob engages the adjacent surface along the lower surface of the stacked lid to provide the primary support for the stable stacking of the stacked lid.

In one embodiment, a first lid includes a cover for covering a container or vessel. The first lid may include a knob positioned along an upper surface. The knob may extend to a circular periphery comprising an engagement surface configured to supportingly engage an annular portion of a concave surface of a second lid. In some embodiments, the cover of the first lid may comprise a lower concave surface and the annular portion of the concave surface of the second lid comprises a comparable radius of curvature of the lower concave surface of cover of the first lid.

In accordance with various embodiments of the present disclosure, lids for covering a container or vessel may preferably comprise a semi-spherical expanse of a covering material having a circular outer rim and a central apex. A knob may be connected at the central apex to protrude from an upper convex surface of the covering material. The knob may include a centrally disposed dimple. A protrusion may be connected to or otherwise extend from the central apex to protrude from a lower concave surface of the covering material. The protrusion may be adapted to fit within the dimple. The knob may have a circular periphery to provide an upper surface comprising a perimeter adapted to support a concave surface along a lower portion of a second lid for stacking. The second lid may include a same or similar knob. In some embodiments, the second lid includes a lower surface having a comparable radius of curvature of to that of the first lid. Thus, stacking platforms may be provided on multiple lids wherein the lids include comparable knob dimensions and radius of curvatures along lower surfaces of the cover such that a first lid may be stacked on a second lid or the second lid may be stacked on the first lid in a similar manner. Additional lids may similarly be interchangeably stacked. The dimple and protrusion may have any shape, so long as the protrusion is dimensioned to fit within the dimple when the lids are in a level stack. The dimple may be concave and the protrusion convex, with each having about the same relative depth so that the protrusion can fill at least about 40 percent of the dimple, but more preferably 60 percent, and most preferably at least about 80 percent of the dimple depth. In various embodiments, multiple lids may stack with respective protrusions disposed within but not contacting the interior surfaces of the knob defining the dimple. In one example, an upper surface of the knob engages the adjacent surface along the lower surface of the stacked lid to provide the primary support for the stable stacking of the stacked lid. The upper surface may comprise an annular periphery or perimeter of the knob, which may be circular, comprising an engagement surface wherein the engagement surface has a radius of curvature comparable to an engagement surface comprising an adjacent surface to the protrusion along the lower surface of the cover being stacked onto the upper surface.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or re-organizing any of the disclosed steps, components, elements, features, aspects, characteristics, limitations, and the like, of the various non-limiting and non-exhaustive embodiments described in this specification.

The structures and surfaces thereof described in the present application may comprise various materials such as metals, alloys, ceramics, glass, plastics, polymers, or the like. Lids may include one or more materials. For example, a lower surface may comprise a same or different material than that of the expanse of covering material or protrusion. Engagement surfaces may include a metal, plastic, alloy, polymer, elastomer or other material. In some embodiments, engagement surfaces may comprise a compressible, elastomeric, or non-slip material.

Various elements described herein have been described as alternatives or alternative combinations, e.g., in a lists of selectable actives, ingredients, or compositions. It is to be appreciated that embodiments may include one, more, or all of any such elements. Thus, this description includes embodiments of all such elements independently and embodiments including such elements in all combinations.

The grammatical articles “one”, “a”, “an”, and “the”, as used in this specification, are intended to include “at least one” or “one or more”, unless otherwise indicated. Thus, the articles are used in this specification to refer to one or more than one (i.e., to “at least one”) of the grammatical objects of the article. By way of example, “a component” means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions “and” and “or” are used herein according to accepted usage. By way of example, “x and y” refers to “x” and “y”. On the other hand, “x or y” refers to “x”, “y”, or both “x” and “y”, whereas “either x or y” refers to exclusivity.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

While the invention has been described in connection with one or more preferred embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

[1. A lid stacking system, the system comprising:

two or more stackable lids, wherein each lid comprises:

a cover comprising an expanse of covering material adapted to cover an interior volume defined by a cooking vessel, wherein the covering material extends from a central portion of the cover to an outer rim;

an upper stacking platform comprising:

a knob extending from an upper surface of the cover at the central portion, and a dimple centrally disposed in the knob between an upper knob surface that extends around a periphery of the knob; and a lower stacking platform comprising:

a protrusion extending from a lower surface of the cover at the central portion, wherein the upper stacking platform of each of the lids is complementary to the lower stacking platforms of the other lids such that lower stacking platforms may be stacked with upper stacking platforms to stably stack the lids, wherein, when stably stacked, the protrusion of a first lower stacking platform of a first lid partially fills the dimple of a second upper stacking platform of a second lid, and wherein an adjacent surface to the protrusion along the lower surface of the cover of the first lid supportingly engages the upper knob surface along a periphery of the knob of the second lid when the first and second lid are stably stacked, and wherein, when received within the dimple, sidewalls of the protrusion define an outer width that is less than an interior width defined between adjacent sidewalls of the dimple such that the protrusion may position within the dimple when the first and second lid are stably stacked without contact between corresponding sidewalls.]

[2. The system of claim 1, wherein the engagement between the adjacent surface and upper knob surface provide vertical support for the stable stacking of the first lid and second lid, and where the corresponding sidewalls of the protrusion of the first lid and the dimple of the second lid engage when the protrusion is offset from a center of the dimple when positioned within the dimple to prevent the stacked lids from laterally offsetting.]

[3. The system of claim 2, wherein a sidewall surface of the protrusion of first lid supportingly engages a sidewall surface of the dimple of the second lid when the protrusion is offset from a center of the dimple when positioned within the dimple to prevent lateral offsetting of the stacked lids.]

[4. The system of claim 1, wherein the upper surface of the knob of the second lid supportingly engages the adjacent surface of the first lid along an annular engagement path.]

[5. The system of claim 4, wherein the upper surface of the cover of each lid is convex and the lower surface of the cover of each lid is concave.]

[6. The system of claim 4, wherein the expanse of covering material is semi-spherical.]

[7. The system of claim 1, wherein the covers of the first and second lids have comparable radius of curvatures.]

[8. The system of claim 1, wherein the protrusion of the first lid fills at least 80% of the dimple of the second lid when the first and second lids are stably stacked.]

[9. The system of claim 1, wherein the two or more stackable lids comprise at least three lids, and wherein the upper stacking platforms and lower stacking platforms are substantially the same such that the lids may be stacked in any order.]

[10. The system of claim 1, wherein the knob and protrusion of each lid are connected to each respective cover through a hole in a central apex of the cover.]

[11. The system of claim 1, wherein the knob of each of the stackable lids further comprise a semi-annular handle that pivotable upward from a storage position in which it lies against a flat expanse of the covering material.]

[12. A stacking platform for a lid stacking system, the stacking platform comprising:

a first upper stacking platform comprising a knob extending from an upper surface of a cover of a first lid and having an upper knob surface and a centrally disposed dimple, the cover adapted for covering a container or vessel;

a first lower stacking platform comprising a protrusion extending from a lower surface of the cover;

wherein the first upper stacking platform is configured to stably stack with a lower stacking platform of a second stacking platform of a second lid when the dimple receives a protrusion of the lower stacking platform of the second stacking platform having substantially same dimensions as the protrusion of the first lower stacking platform, wherein the first lower stacking platform is configured to stably stack an upper stacking platform of a third stacking platform of a third lid when the protrusion is received within a dimple disposed in a knob of the upper stacking platform of the third stacking platform having substantially same dimensions as the dimple and knob of the first upper stacking platform, wherein an adjacent surface to the protrusion along the lower surface of the cover supportingly engages an upper knob surface along a periphery of the knob of the upper stacking platform of the third stacking platform when the protrusion is received therein, and wherein, when received within the respective dimples, sidewalls of the respective protrusions define an outer width that is less than an interior width defined between adjacent sidewalls of the respective dimples when the lids are stably stacked such that the protrusions may position within the dimples when stably stacked without contact between corresponding sidewalls.]

[13. The stacking platform of claim 12, wherein the adjacent surface supportingly engages the upper knob surface along the periphery of the knob of the upper stacking platform of the third stacking platform along an annular engagement path.]

[14. The stacking platform of claim 13, wherein the expanse of covering material is semi-spherical and the adjacent surface is concave.]

[15. The stacking platform of claim 12, wherein covers of the first, second, and third lids have comparable radius of curvatures.]

[16. A lid for covering a container or vessel that comprises:

(a) a cover comprising a semi-spherical expanse of a covering material having a circular outer rim and a central apex, (b) a knob extending from the central apex to protrude from an upper convex surface of the cover, the knob having an upper surface with a centrally disposed dimple a defined between sidewalls and a base, and wherein the sidewalls define an interior width of the dimple, and the base, together with the upper surface, define a length of the dimple;

(c) a protrusion having sidewalls defining an outer width and extending from the central apex to protrude a length from a lower concave surface of the cover, the lower concave surface having an annular portion that extends along the lower concave surface, around the protrusion, wherein the length of the protrusion is less than the length of the dimple and the outer width of the protrusion is less than the interior width of the dimple along corresponding lengths such that, if the lid is stacked on a same second lid, with the circular periphery along the upper surface of the knob of the second lid engaged with the annular portion along the lower concave surface to provide vertical support, the protrusion may partially fill the dimple of the second lid without contacting the base or sidewalls of the dimple of the second lid but the sidewalls of the protrusion engage with the sidewalls of the dimple of the second lid when the protrusion is offset from a center of the dimple of the second lid to prevent the stacked lids from laterally offsetting.]

*17. A set of stackable lids comprising:*

*a plurality of stackable lids, wherein each lid comprises:*

*a cover having an upper side and a lower side;*

*a protrusion comprising one or more sidewalls that extend downward from the lower side of the cover to a base of the protrusion; and*

*a knob extending upward from the upper side of the cover to a knob end and defining a dimple, the dimple comprising one or more sidewalls extending from the knob end to a base of the dimple,*

*wherein the dimple of each of the plurality of lids is complementary to the protrusion of each other lid of the plurality of lids such that the lids may be interchangeably stacked when the dimple of a first lid receives the protrusion of a second lid to stably stack the lids,*

*wherein the knob ends have a top surface that extends above the dimple, and*

*wherein, when stably stacked, the top surface of the knob end of the first lid and a surface of the second lid adjacent to the protrusion are supportively engaged to provide support to the second lid and the protrusion of the second lid may be received within the dimple of the first lid without contact between the corresponding sidewalls of the dimple and protrusion.*

*18. The set of stackable lids of claim 17, wherein the surface adjacent to the protrusion of the second lid is located along the lower side of the cover.*

*19. The set of stackable lids of claim 17, wherein the top surface of the knob end of the first lid and the surface adjacent to the protrusion of the second lid supportively engage along an annular engagement path.*

*20. The set of stackable lids of claim 17, wherein the upper surface of the cover of each lid is convex and the lower surface of the cover of each lid is concave.*

*21. The set of stackable lids of claim 17, wherein, when stably stacked, the base of the dimple of the first lid and the base of the protrusion of the second lid are spaced apart.*

*22. A set of stackable lids comprising:*

*a plurality of stackable lids, wherein each lid comprises:*

*a cover having an upper side and a lower side;*

*a protrusion extending downward from the lower side of the cover and having a base and a sidewall; and*

*a knob extending upward from the upper side of the cover to a knob end and defining a dimple, the dimple vertically aligned with the protrusion with respect to the cover and having a base and a sidewall,*

*wherein the dimple of each of the lids is complementary to the protrusion of each of the lids such that the lids may be interchangeably stacked when the dimple of a first lid receives the protrusion of a second lid to stably stack the lids,*

*wherein, when stably stacked, the protrusion of the second lid may position within the dimple of the first lid without contact between the corresponding sidewalls of the dimple and protrusion, and the corresponding sidewalls of the protrusion of the first lid and dimple of the second lid are configured to supportively engage when the protrusion is offset from a center of the dimple to prevent the stacked lids from laterally offsetting further,*

*wherein the knob ends have a top surface that extends above the dimple, and*

*wherein, when stably stacked, the top surface of the knob end of the first lid is spaced apart from the second lid.*

*23. The set of stackable lids of claim 22, wherein the corresponding sidewalls of the protrusion of the second lid and the dimple of the first lid supportively engage only along a corresponding portion of the sidewalls when the protrusion is offset from the center of the dimple.*

*24. The set of stackable lids of claim 22, wherein, when stably stacked, the base of the dimple of the first lid and the base of the protrusion of the second lid are supportively engaged to provide support to the second lid.*

*25. The set of stackable lids of claim 22, wherein the top surface of the knob is positioned to supportively engage the second lid to prevent instability in the stacked first and second lids if the cover of the second lid tilts relative to the cover of the first lid.*

*26. A set of stackable lids comprising:*

*a plurality of stackable lids, wherein each lid comprises:*

*a cover having an upper side and a lower side;*

*a protrusion extending downward from the lower side of the cover and having a base and a sidewall; and*

*a knob extending upward from the upper side of the cover to a knob end and defining a dimple, the dimple having a base and a sidewall,*

*wherein the dimple of each of the lids is complementary to the protrusion of each of the lids such that the lids may be interchangeably stacked when the dimple of a first lid receives the protrusion of a second lid to stably stack the lids,*

*wherein, when stably stacked, the protrusion of the second lid may position within the dimple of the first lid without contact between the corresponding sidewalls of the dimple and protrusion, and the corresponding sidewalls of the protrusion of the first lid and dimple of the second lid are configured to supportively engage when the protrusion is offset from a center of the dimple to prevent the stacked lids from laterally offsetting further,*

*wherein the knob ends have a top surface that extends above the dimple, and*

*wherein, when stably stacked, the top surface of the knob end of the first lid and a surface of the second lid adjacent to the protrusion of the second lid are supportively engaged to provide support to the second lid.*

*27. The set of stackable lids of claim 26, wherein the surface of the second lid adjacent to the protrusion of the second lid is located along the lower side of the cover.*

*28. The set of stackable lids of claim 26, wherein the top surface of the knob end of the first lid and the surface of the second lid adjacent to the protrusion of the second lid supportively engage along an annular engagement path.*

*29. The set of stackable lids of claim 26, wherein the upper surface of the cover of each lid is convex and the lower surface of the cover of each lid is concave.*

*30. The set of stackable lids of claim 26, wherein, when stably stacked, the base of the dimple of the first lid and the base of the protrusion of the second lid are spaced apart.*

*31. A set of stackable lids comprising:*

*a plurality of stackable lids, wherein each lid comprises:*

*a cover having an upper side, a lower side, and a central apex;*

*a protrusion that extends from the lower side of the cover at the central apex; and*

*a knob extending upward from the upper side of the cover to a knob end and defining a dimple, the knob end located at an upper most portion of the knob and defining an annular shaped upper rim of the knob;*

*wherein the dimple of each of the lids is complementary to the protrusion of each of the lids such that the lids may be interchangeably stacked when the dimple of a first lid receives and supportively engages the protrusion of a second lid to stably stack the lids, and*

*wherein, when stably stacked, the annular shaped upper rim of the knob end of the first lid is spaced apart from the second lid and is configured to supportively engage a surface adjacent to the protrusion of second lid if the cover of the second lid tilts relative to the cover of the first lid to prevent instability in the stack of lids.*

*32. The set of stackable lids of claim 31, wherein each of the dimples and the protrusions include a base, and wherein, when stably stacked, the base of the dimple of the first lid and the base of the protrusion of the second lid are supportively engaged.*

*33. The set of stackable lids of claim 31, wherein, when stably stacked, the protrusion of the second lid partially fills the dimple of the first lid.*

*34. The set of stackable lids of claim 33, wherein each of the dimples and the protrusions include a base, and wherein, when stably stacked, the base of the dimple of the first lid and the base of the protrusion of the second lid are supportively engaged.*

*35. The set of stackable lids of claim 34, wherein each of the dimples and protrusions include a sidewall, and wherein, when stably stacked, the protrusion of the second lid may be positioned within the dimple of the first lid without contact between the corresponding sidewalls of the dimple and the protrusion.*

*36. The set of stackable lids of claim 35, wherein, when stably stacked, the corresponding sidewalls of the protrusion of the second lid and the dimple of the first lid are configured to supportively engage if the protrusion is offset from a center of the dimple to prevent the stacked first and second lids from laterally offsetting further.*

*37. The set of stackable lids of claim 31, wherein the surface adjacent to the protrusion of the second lid is located along the lower side of the cover.*

*38. The set of stackable lids of claim 31, wherein the upper surface of the cover of each lid is convex and the lower surface of the cover of each lid is concave.*

*39. A set of stackable lids comprising:*

*a plurality of stackable lids, wherein each lid comprises:*

*a cover having an upper side and a lower side;*

*a protrusion that extends from the lower side of the cover; and*

*a knob extending from the upper side of the cover to a knob end having a top surface, wherein a dimple is formed in the knob end and is surrounded by the top surface;*

*wherein the dimple of each of the lids is complementary to the protrusion of each of the lids such that the lids may be interchangeably stacked when the dimple of a first lid receives and supportively engages the protrusion of a second lid to stably stack the lids,*

*wherein, when stably stacked, the top surface of the knob end of the first lid is spaced apart from the second lid and is configured to supportively engage a surface adjacent to the protrusion of second lid if the cover of the second lid tilts relative to the cover of the first lid to prevent instability in the stack of lids, and*

*wherein each of the dimples and the protrusions include a sidewall, and wherein, when stably stacked, the corresponding sidewalls of the dimple of the first lid and the protrusion of the second lid are supportively engaged.*

*40. A set of stackable lids comprising:*

*a plurality of stackable lids, wherein each lid comprises:*

*a cover having an upper side and a lower side;*

*a protrusion that extends from the lower side of the cover; and*

*a knob extending from the upper side of the cover to a knob end having a top surface, wherein a dimple is formed in the knob end and is surrounded by the top surface;*

*wherein the dimple of each of the lids is complementary to the protrusion of each of the lids such that the lids may be interchangeably stacked when the dimple of a first lid receives and supportively engages the protrusion of a second lid to stably stack the lids,*

*wherein, when stably stacked, the top surface of the knob end of the first lid is spaced apart from the second lid and is configured to supportively engage a surface adjacent to the protrusion of second lid if the cover of the second lid tilts relative to the cover of the first lid to prevent instability in the stack of lids,*

*wherein, when stably stacked, the protrusion of the second lid partially fills the dimple of the first lid, and*

*wherein each of the dimples and the protrusions include a base and a sidewall, and wherein, when stably stacked, the base of the dimple of the first lid and the base of the protrusion of the second lid are spaced apart and the corresponding sidewalls of the dimple and the protrusion of the respective first and second lids are supportively engaged.*

*41. A set of stackable lids comprising:*

*a plurality of stackable lids, wherein each lid comprises*

*a cover having an upper side and a lower side; and*

*a knob comprising an upper portion that extends to a top surface above the upper side of the cover and a lower portion that extends below the lower side of the cover, wherein the lower portion of the knob comprises a conical portion and the upper portion of the knob comprises a complementary portion that is complementary to the conical portion, and*

*wherein the complementary portion of each lid is configured to receive and supportively engage the conical portion of any other lid of the plurality of lids to stably stack the lids without the top surface of the upper portion of the knob of a first lid contacting the lower portion of the knob or the lower side of the cover of a second lid that is stacked on top of it.*

*42. A set of stackable lids comprising:*

*a plurality of stackable lids, wherein each lid comprises:*

*a cover having an upper side and a lower side; and*

*a knob comprising an upper portion that extends to a top surface above the upper side of the cover and a lower portion that extends below the lower side of the cover, wherein the lower portion of the knob comprises a conical portion and the upper portion of the knob comprises a complementary portion that is complementary to the conical portion,*

*wherein the complementary portion of each lid is configured to receive and supportively engage the conical portion of any other lid of the plurality of lids to stably stack the lids without the top surface of the upper portion of the knob of a first lid contacting the lower portion of the knob or the lower side of the cover of a second lid that is stacked on top of it, and*

*wherein the top surface of the upper portion of the knob of the first lid is configured to supportively engage the second lid stacked on top of it if the cover of the second lid tilts relative to the cover of the first lid to prevent instability in the stack of lids.*

*43. The set of stackable lids of claim 42, wherein each of the complementary portions and the conical portions include a base and a sidewall, and wherein, when stably stacked, the base of the complementary portion of the first lid and the base of the conical portion of the second lid are spaced apart and the sidewall of the complementary portion of the first lid and the sidewall of the conical portion of the second lid are supportively engaged.*

*44. A set of stackable lids comprising:*

*a plurality of stackable lids, wherein each lid comprises:*

*a cover having an upper side and a lower side; and*

*a knob comprising an upper portion that extends to a top surface above the upper side of the cover and a lower portion that extends below the lower side of the cover, wherein the lower portion of the knob comprises a conical portion and the upper portion of the knob comprises a complementary portion that is complementary to the conical portion, the conical portion defined by one or more sidewalls and extending to a base,*

*wherein the complementary portion of each lid is configured to receive and supportively engage the conical portion of any other lid of the plurality of lids to stably stack the lids without the top surface of the upper portion of the knob of a first lid contacting the lower portion of the knob or the lower side of the cover of a second lid that is stacked on top of it, and*

*wherein, when stably stacked, a base of the complementary portion of the first lid and the base of the conical portion of the second lid are supportively engaged.*

*45. The set of stackable lids of claim 44, wherein each of the complementary portions and the conical portions include a sidewall, and wherein, when stably stacked, at least a portion of the sidewall of the complementary portion of the first lid and the sidewall of the conical portion of the second lid are supportively engaged.*

*46. The set of stackable lids of claim 44, wherein, when stably stacked, the conical portion of the second lid partially fills the complementary portion of the first lid.*

*47. A set of stackable lids comprising:*

*a plurality of stackable lids, wherein each lid comprises*

*a cover having an upper side and a lower side; and*

*a knob comprising an upper portion that extends to a top surface above the upper side of the cover and a lower portion that extends below the lower side of the cover, wherein the lower portion of the knob comprises a conical portion and the upper portion of the knob comprises a complementary portion that is complementary to the conical portion,*

*wherein the complementary portion of each lid is configured to receive and supportively engage the conical portion of any other lid of the plurality of lids to stably stack the lids without the top surface of the upper portion of the knob of a first lid contacting the lower portion of the knob or the lower side of the cover of a second lid that is stacked on top of it,*

*wherein, when stably stacked, the conical portion of the second lid partially fills the complementary portion of the first lid,*

*wherein each of the complementary portions and the conical portions include a base, and*

*wherein, when stably stacked, the base of the complementary portion of the first lid and the base of the conical portion of the second lid are supportively engaged.*

*48. A set of stackable lids comprising:*

*a plurality of stackable lids, wherein each lid comprises*

*a cover having an upper side and a lower side; and*

*a knob comprising an upper portion that extends to a top surface above the upper side of the cover and a lower portion that extends below the lower side of the cover, wherein the lower portion of the knob comprises a conical portion and the upper portion of the knob comprises a complementary portion that is complementary to the conical portion,*

*wherein the complementary portion of each lid is configured to receive and supportively engage the conical portion of any other lid of the plurality of lids to stably stack the lids without the top surface of the upper portion of the knob of a first lid contacting the lower portion of the knob or the lower side of the cover of a second lid that is stacked on top of it,*

*wherein, when stably stacked, the conical portion of the second lid partially fills the complementary portion of the first lid,*

*wherein each of the complementary portions and the conical portions include a sidewall, and*

*wherein, when stably stacked, the conical portion of the second lid may be positioned within the complementary portion of the first lid without contact between the corresponding sidewalls of the complementary portion and the conical portion.*

*49. The set of stackable lids of claim 48, wherein, when stably stacked, the corresponding sidewalls of the of the complementary portion of the first lid and the conical portion of the second lid are configured to supportively engage if the conical portion is offset from a center of the complementary portion to prevent the stacked lids from laterally offsetting further.*

*50. The set of stackable lids of claim 48, wherein the upper surface of the cover of each lid is convex and the lower surface of the cover of each lid is concave.*

*51. A set of stackable lids comprising:*

*a plurality of stackable lids, wherein each lid comprises:*

*a cover having an upper surface and a lower surface; and*

*a knob comprising an upper portion that extends above the upper surface of the cover and a lower portion that extends below the lower surface of the cover, wherein an outer surface of the upper portion of the knob defines a complementary portion that is complementary to a conical portion of the lower portion, the conical portion defined by one or more sidewalls and extending to a base,*

*wherein the conical portion of each lid is configured to be supportively engaged by the complementary portion of the upper knob portion of any other lid of the plurality of lids to stably stack the lids without the upper portions of the knobs contacting the cover of the respective lid stacked upon it, and*

*wherein, when a first lid of the plurality of lids is stacked with a second lid of the plurality of lids, the base of the conical portion of the first lid supportively engages a base of the complementary portion of the second lid.*

*52. A set of stackable lids comprising:*

*a plurality of stackable lids, wherein each lid comprises:*

*a cover having an upper surface and a lower surface; and*

*a knob comprising an upper portion that extends above the upper surface of the cover and a lower portion that extends below the lower surface of the cover, wherein an outer surface of the upper portion of the knob defines a complementary portion that is complementary to a conical portion of the lower portion, the conical portion defined by one or more sidewalls and extending to a base,*

*wherein the conical portion of each lid is configured to be supportively engaged by the complementary portion of the upper knob portion of any other lid of the plurality of lids to stably stack the lids without the upper portions of the knobs contacting the cover of the respective lid stacked upon it, and*

*wherein, when a first lid of the plurality of lids is stacked with a second lid of the plurality of lids, the conical portion of the first lid may be positioned within the complementary portion of the second lid without the one or more sidewalls of the conical portion contacting the corresponding complementary portion of the second lid.*

* * * * *